US005907657A

United States Patent [19]

Shima

[11] Patent Number: 5,907,657

[45] Date of Patent: *May 25, 1999

[54] VIDEO RECORDING, TRANSMITTING AND REPRODUCING WITH CONCURRENT RECORDING AND TRANSMITTING OR MULTIPLE DUBBING OF COPY PROTECTED VIDEO SIGNALS

[75] Inventor: Hisato Shima, Chiba, Japan

[73] Assignee: Sony Corporation, Tokyo, Japan

[ * ] Notice: This patent is subject to a terminal disclaimer.

[21] Appl. No.: 08/861,985

[22] Filed: May 22, 1997

Related U.S. Application Data

[62] Division of application No. 08/388,499, Feb. 14, 1995, Pat. No. 5,673,357.

[30] Foreign Application Priority Data

Feb. 15, 1994 [JP] Japan ................................. 6-040450

[51] Int. Cl.⁶ .............................. H04N 5/91; H04N 5/917
[52] U.S. Cl. ................................................ 386/94; 386/109
[58] Field of Search ........................... 386/94, 46, 109, 386/102, 111; 380/5, 10, 7, 3, 11, 15; 360/60, 15, 27; H04N 5/91, 5/917

[56] References Cited

U.S. PATENT DOCUMENTS

| 5,140,437 | 8/1992 | Yonemitsu et al. | 386/111 |
| 5,627,655 | 5/1997 | Okamoto et al. | 386/94 |

*Primary Examiner*—Robert Chevalier
*Attorney, Agent, or Firm*—Frommer, Lawrence & Haug, LLP; William S. Frommer; Dennis M. Smid

[57] ABSTRACT

A method of recording and reproducing video signals which include video information and copy protection information for restricting the number of times the video information may be copied. Original video information is recorded onto a recording medium with updated copy protection information that indicates that the video information has been copied and is also transmitted with the original copy protection information so that more than one copy of the video information may be generated from the original. The transmitted video information is outputted and/or recorded onto a recording medium with the updated copy protection information.

52 Claims, 24 Drawing Sheets

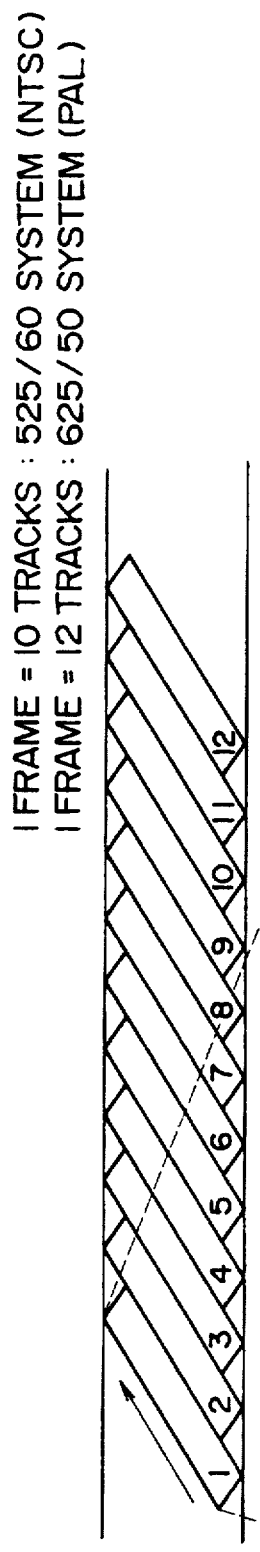
F I G. 2A
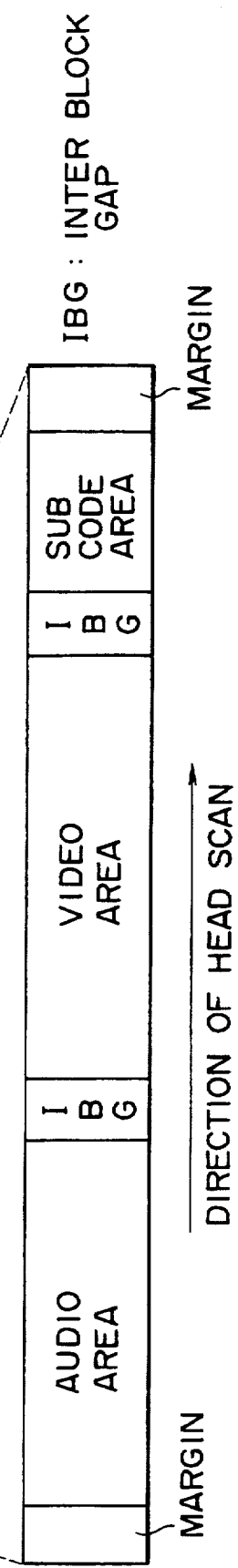
F I G. 2B

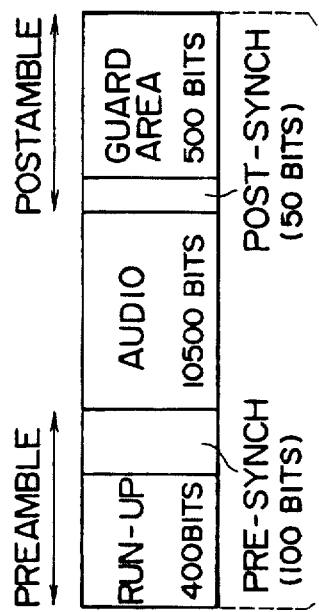
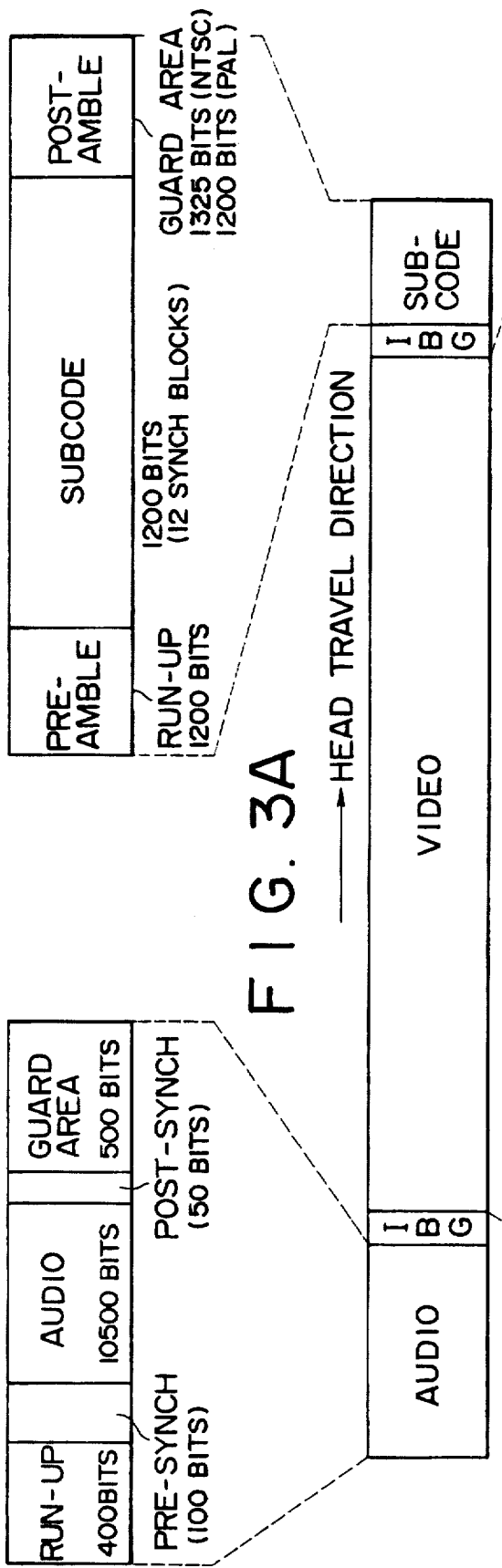
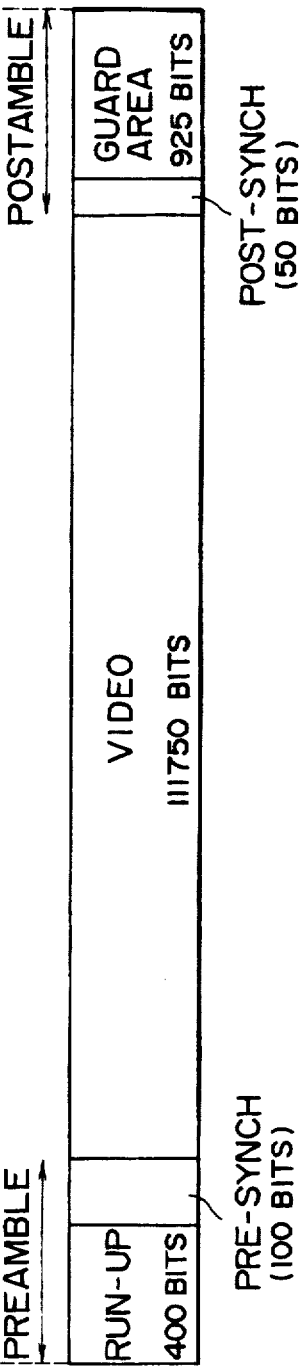

FIG. 4A

AAUX SYNCH
AUDIO SYNCH
VIDEO SYNCH

| | ID0 | ID1 |
|---|---|---|
| MSB | SEQ 3 | SYNCH 7 |
| | SEQ 2 | SYNCH 6 |
| | SEQ 1 | SYNCH 5 |
| | SEQ 0 | SYNCH 4 |
| | TRACK 3 | SYNCH 3 |
| | TRACK 2 | SYNCH 2 |
| | TRACK 1 | SYNCH 1 |
| LSB | TRACK 0 | SYNCH 0 |

FIG. 4B

PRE-SYNCH
POST-SYNCH
C2 PARITY SYNCH

| | ID0 | ID1 |
|---|---|---|
| MSB | AP1/AP2 2 | SYNCH 7 |
| | AP1/AP2 1 | SYNCH 6 |
| | AP1/AP2 0 | SYNCH 5 |
| | SEQ 0 | SYNCH 4 |
| | TRACK 3 | SYNCH 3 |
| | TRACK 2 | SYNCH 2 |
| | TRACK 1 | SYNCH 1 |
| LSB | TRACK 0 | SYNCH 0 |

☐ : AAUX

FIG. 8

| WORD NAME | | MSB | | | | | | LSB |
|---|---|---|---|---|---|---|---|---|
| PC0 | (ITEM) | | | | | | | |
| PC1 | | | | | | | | |
| PC2 | (DATA) | | | | | | | |
| PC3 | | | | | | | | |
| PC4 | | | | | | | | |

FIG. 9

| MSB | LSB | |
|---|---|---|
| UPPER | LOWER | |
| 0 0 0 0 | x x x x | CONTROL |
| 0 0 0 1 | x x x x | TITLE |
| 0 0 1 0 | x x x x | CHAPTER |
| 0 0 1 1 | x x x x | PART |
| 0 1 0 0 | x x x x | PROGRAM |
| 0 1 0 1 | x x x x | LINE |
| 0 1 1 0 | x x x x | VAUX |
| 0 1 1 1 | x x x x | AAUX |
| 1 0 0 0 | x x x x | RESERVED |
| ⋮ | | |
| 1 1 1 0 | x x x x | |
| 1 1 1 1 | a a a a | SOFT MODE |
| 1 1 1 1 | 1 1 1 1 | NO INFORMATION | a a a a : 0 0 0 0 ~ 1 1 1 0
x x x x : 0 0 0 0 ~ 1 1 1 1

[VAUX PACK STRUCTURE]

FIG. 11

[VAUX]

60~65 : VAUX MAIN AREA

OPTION ACTUAL DATA NUMBER 1560 BYTES

| TRACK NO. → | 1 | 2 | 3 | 4 | 5 | 6 | 7 | 8 | 9 | 10 |
|---|---|---|---|---|---|---|---|---|---|---|
| 40 | 65 |  | 65 |  | 65 |  | 65 |  | 65 |  |
|  | 64 |  | 64 |  | 64 |  | 64 |  | 64 |  |
|  | 63 |  | 63 |  | 63 |  | 63 |  | 63 |  |
|  | 62 |  | 62 |  | 62 |  | 62 |  | 62 |  |
|  | 61 |  | 61 |  | 61 |  | 61 |  | 61 |  |
|  | 60 |  | 60 |  | 60 |  | 60 |  | 60 |  |
| 5 |  | 65 |  | 65 |  | 65 |  | 65 |  | 65 |
|  |  | 64 |  | 64 |  | 64 |  | 64 |  | 64 |
|  |  | 63 |  | 63 |  | 63 |  | 63 |  | 63 |
|  |  | 62 |  | 62 |  | 62 |  | 62 |  | 62 |
|  |  | 61 |  | 61 |  | 61 |  | 61 |  | 61 |
| 0 |  | 60 |  | 60 |  | 60 |  | 60 |  | 60 |

PACK NO.

FIG. 12A  AAUX SOURCE CONTROL

| | MSB | | | | | | | LSB |
|---|---|---|---|---|---|---|---|---|
| PC0 | 0 | 1 | 0 | 1 | 0 | 0 | 0 | 1 |
| PC1 | SCMS | | RESERVED | | | | | |
| PC2 | REC ST | REC END | REC MODE | | 1 | 1 | 1 | 1 |
| PC3 | DRF | SPEED | | | | | | |
| PC4 | 1 | GENRE CATEGORY | | | | | | |

FIG. 12B  VAUX SOURCE CONTROL

| | MSB | | | | | | | LSB |
|---|---|---|---|---|---|---|---|---|
| PC0 | 0 | 1 | 1 | 0 | 0 | 0 | 0 | 1 |
| PC1 | SCMS | | RESERVED | | | | | |
| PC2 | REC ST | 1 | REC MODE | | 1 | DISP | | |
| PC3 | FF | FS | FC | IL | ST | SC | BCSYS | |
| PC4 | 1 | GENRE CATEGORY | | | | | | |

SCMS

UPPER BIT : 0 = NO COPY PROTECTION
                      1 = COPY PROTECTED

LOWER BIT : 0 = ORIGINAL
                      1 = NOT ORIGINAL

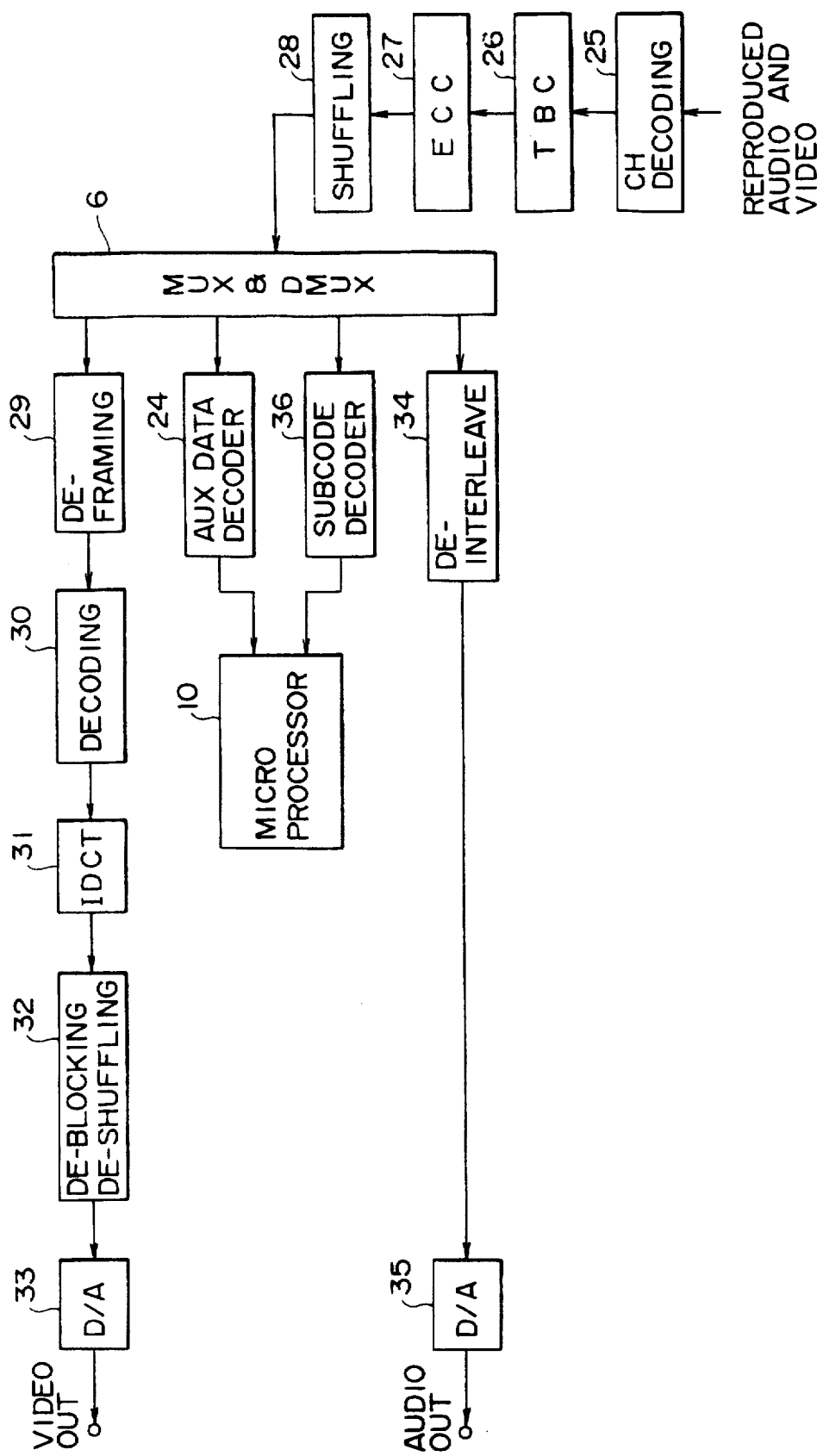

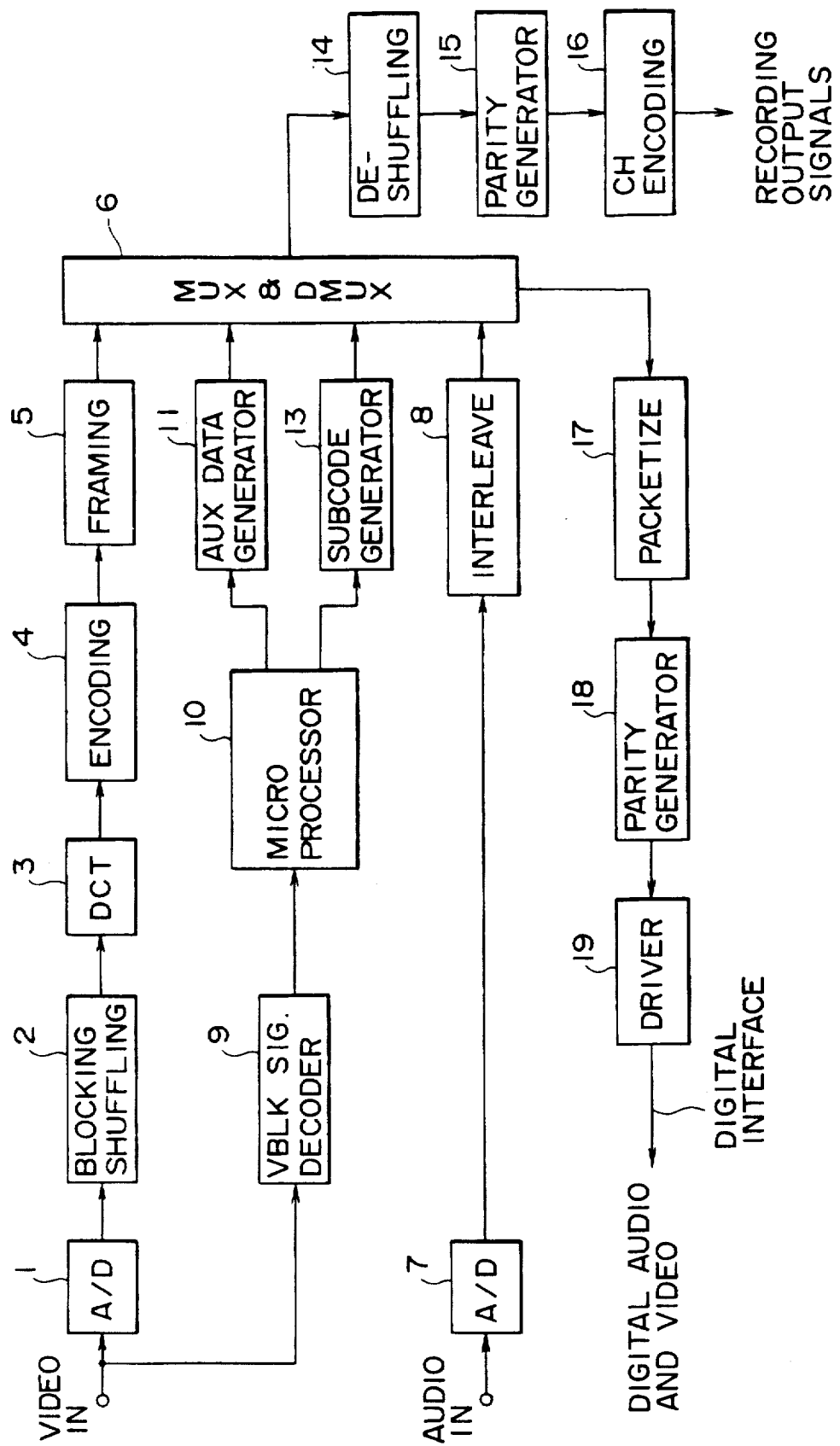

F I G. 18a
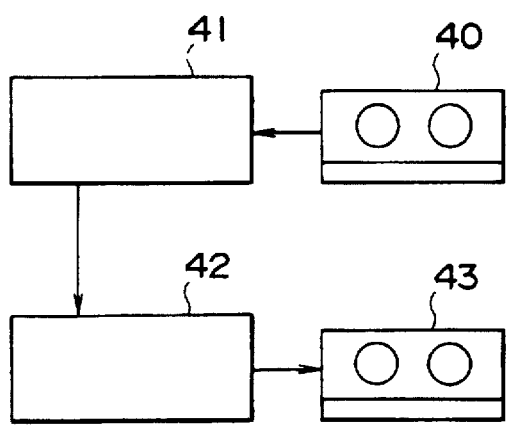
F I G. 18c
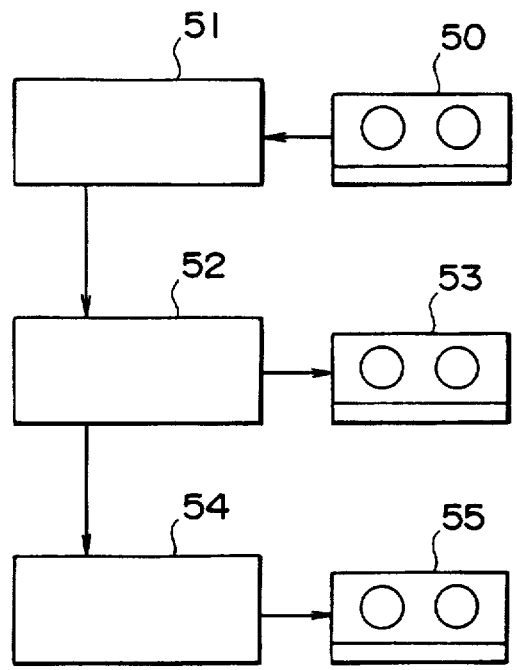
F I G. 18b
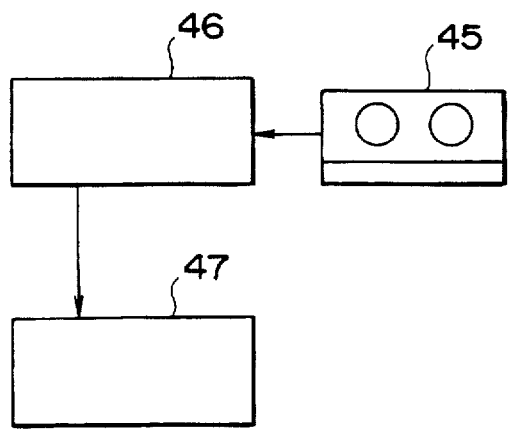

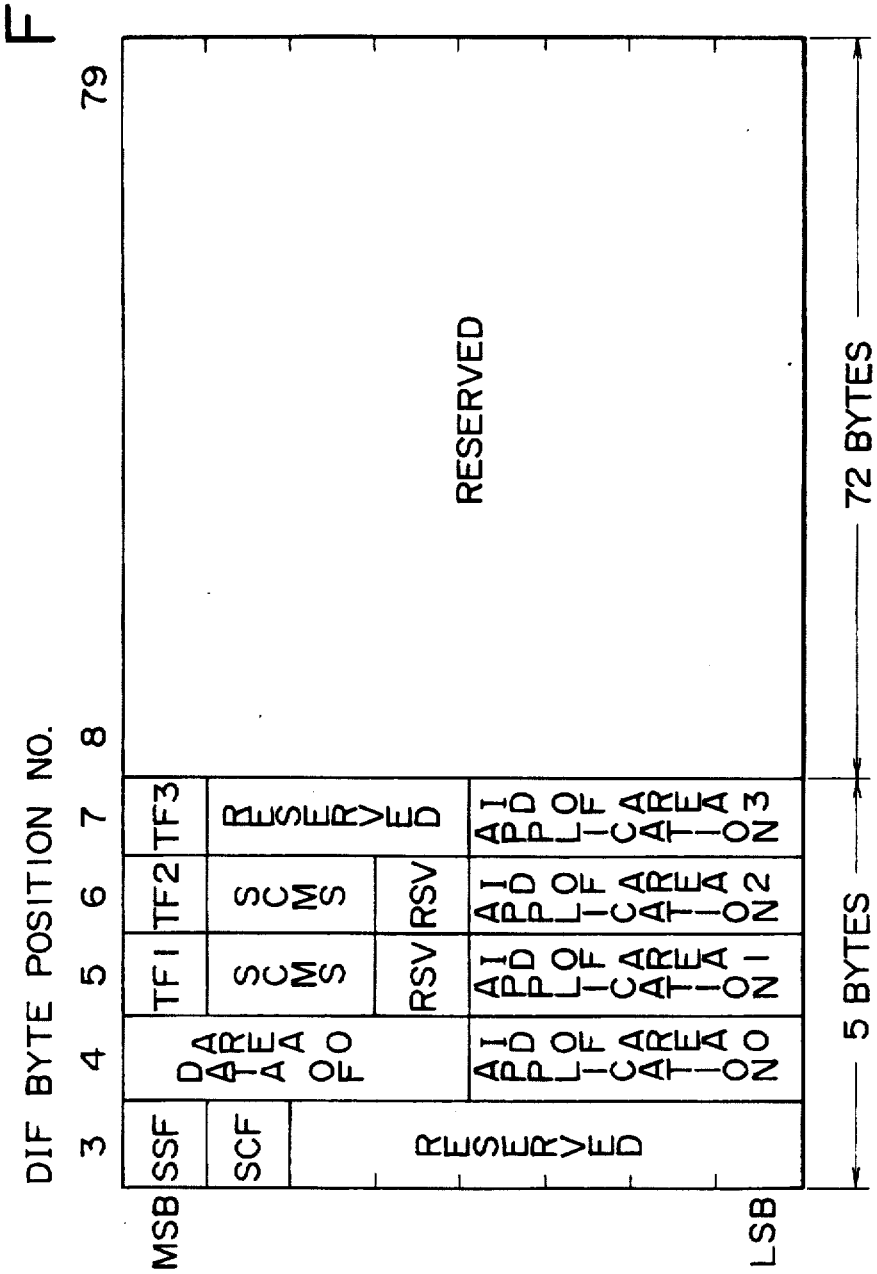

FIG. 23

| H₀ | SC₀ | SC₁ | VA₀ | VA₁ | VA₂ | | | | | | | | | |
|---|---|---|---|---|---|---|---|---|---|---|---|---|---|---|
| A₀ | V₀ | V₁ | V₂ | V₃ | V₄ | V₅ | V₆ | V₇ | V₈ | V₉ | V₁₀ | V₁₁ | V₁₂ | V₁₃ | V₁₄ |
| A₁ | V₁₅ | V₁₆ | V₁₇ | V₁₈ | V₁₉ | V₂₀ | V₂₁ | V₂₂ | V₂₃ | V₂₄ | V₂₅ | V₂₆ | V₂₇ | V₂₈ | V₂₉ |
| A₂ | V₃₀ | V₃₁ | V₃₂ | V₃₃ | V₃₄ | V₃₅ | V₃₆ | V₃₇ | V₃₈ | V₃₉ | V₄₀ | V₄₁ | V₄₂ | V₄₃ | V₄₄ |
| A₃ | V₄₅ | V₄₆ | V₄₇ | V₄₈ | V₄₉ | V₅₀ | V₅₁ | V₅₂ | V₅₃ | V₅₄ | V₅₅ | V₅₆ | V₅₇ | V₅₈ | V₅₉ |
| A₄ | V₆₀ | V₆₁ | V₆₂ | V₆₃ | V₆₄ | V₆₅ | V₆₆ | V₆₇ | V₆₈ | V₆₉ | V₇₀ | V₇₁ | V₇₂ | V₇₃ | V₇₄ |
| A₅ | V₇₅ | V₇₆ | V₇₇ | V₇₈ | V₇₉ | V₈₀ | V₈₁ | V₈₂ | V₈₃ | V₈₄ | V₈₅ | V₈₆ | V₈₇ | V₈₈ | V₈₉ |
| A₆ | V₉₀ | V₉₁ | V₉₂ | V₉₃ | V₉₄ | V₉₅ | V₉₆ | V₉₇ | V₉₈ | V₉₉ | V₁₀₀ | V₁₀₁ | V₁₀₂ | V₁₀₃ | V₁₀₄ |
| A₇ | V₁₀₅ | V₁₀₆ | V₁₀₇ | V₁₀₈ | V₁₀₉ | V₁₁₀ | V₁₁₁ | V₁₁₂ | V₁₁₃ | V₁₁₄ | V₁₁₅ | V₁₁₆ | V₁₁₇ | V₁₁₈ | V₁₁₉ |
| A₈ | V₁₂₀ | V₁₂₁ | V₁₂₂ | V₁₂₃ | V₁₂₄ | V₁₂₅ | V₁₂₆ | V₁₂₇ | V₁₂₈ | V₁₂₉ | V₁₃₀ | V₁₃₁ | V₁₃₂ | V₁₃₃ | V₁₃₄ |

FIRST PACKET → TRANSMISSION ORDER → LAST PACKET $H_0$ : HEADER
$SC_i$ : SUBCODE ($i = 0, 1$)
$VA_i$ : VAUX ($i = 0, 1, 2$)
$A_i$ : AUDIO ($i = 0, \ldots, 8$)
$V_i$ : VIDEO ($i = 0, \ldots, 134$)

VIDEO RECORDING, TRANSMITTING AND REPRODUCING WITH CONCURRENT RECORDING AND TRANSMITTING OR MULTIPLE DUBBING OF COPY PROTECTED VIDEO SIGNALS

This application is a division of application Ser. No. 08/388,499, filed Feb. 14, 1995, now U.S. Pat. No. 5,673, 357.

BACKGROUND OF THE INVENTION

The present invention relates to apparatus for recording and reproducing video signals and, more particularly, to recording, reproducing and dubbing video signals which include video information and copy protection information for restricting the number of times the video information is copied.

In video recording and reproducing apparatus, such as a video cassette recorder (VCR) or a camcorder, input video signals and input audio signals are processed and recorded on a recording medium, such as a tape, for subsequent reproduction. FIG. 1 is a block diagram of a proposed signal processing circuit of the recording side of a digital recording and reproducing device and is described in copending application Ser. No. 08/304,878, filed Feb. 7, 1995.

As shown in FIG. 1, an analog composite video signal, which, for example, is comprised of video signals Y, R-Y, and B-Y, is supplied to an A/D processing circuit 1, which converts the analog composite video signal to a digital video signal and delivers the signal to a blocking/shuffling circuit 2.

The blocking/shuffling circuit 2 samples the data in an effective scan area of one frame of the digital composite video signal (that is, an area which contains viewable information) and arranges the samples into units. As an example, the Y, R-Y, and B-Y components of the digital composite video signal of the frame are respectively divided into a predetermined number of horizontal samples and into a predetermined number of vertical samples, and the samples are grouped into units formed of eight horizontal samples by eight vertical samples.

The blocking/shuffling circuit 2 supplies the units to a Discrete Cosine Transform (DCT) circuit 3 which transforms the units into DCT units and delivers the DCT units to encoding circuit 4. The encoding circuit 4 quantizes the DCT units and variable length encodes the quantized DCT units using, for example, a two-dimensional Huffman code. The encoding circuit 4 quantizes the DCT units in buffering units of 30 DCT units each, for example, so that the length of the variable length encoded output of the encoding circuit 4 is within a predefined value.

The operation of the blocking/shuffling circuit 2, Discrete Cosine Transform (DCT) circuit 3 and the encoding circuit 4 are known in the art and are not further described.

The encoding circuit 4 delivers the variable length encoded output to a framing circuit 5, which forms blocks of video signals in a predefined format from the variable length encoded output. The blocks of video signals are delivered to a switching circuit 6 which comprises a multiplexing circuit or a multiplexing/demultiplexing circuit.

An input analog audio signal is converted to a digital audio signal by an A/D processing circuit 7 which delivers the digital audio signal to an interleaving circuit 8. The interleaving circuit 8 interleaves the digital audio signal so that the effect of burst errors on the sound quality is minimized and then delivers the interleaved audio signal to the switching circuit 6.

A microprocessor 10 generates and delivers accompanying audio and video information to an accompanying (AUX) data generating circuit 11 which forms blocks of accompanying video signals, such as formatted VAUX signals, and blocks of accompanying audio signals, such as formatted AAUX signals, under the control of the microprocessor 10. VAUX and AAUX signals are described in application Ser. No. 08/384,879. The AUX data generating circuit 11 delivers the formatted VAUX signals and the formatted AAUX signals to the switching circuit 6.

The microprocessor 10 generates and delivers subcode information, used for high-speed searching of the recording medium, to a subcode generating circuit 13 which generates formatted subcode signals under the control of the microprocessor 10. The subcode generating circuit 13 delivers the formatted subcode signals to the switching circuit 6.

The switching circuit 6 combines the blocks of video signals and the formatted VAUX signals to form blocks of associated video signals in a first predefined format and combines the interleaved audio signals and the formatted AAUX signals to form blocks of associated audio signals in a second predefined format. The switching circuit 6 supplies the blocks of associated video signals, the blocks of associated audio signals and the blocks of formatted subcode signals to a deshuffling circuit 14.

The deshuffling circuit 14 temporarily stores the blocks of associated video signals, the blocks of associated audio signals and the formatted subcode signals in a frame memory and rearranges the blocks of associated video signals so that blocks of associated video signals that correspond to adjacent regions of the video frame are recorded on adjacent regions of the recording medium. The deshuffling circuit 14 delivers the rearranged blocks of associated video signals, the blocks of associated audio signals and the formatted subcode signals to a parity generating circuit 15 which adds an error correcting code and delivers the signals to a channel encoder 16. The channel encoder 16 signal modulates the rearranged blocks of associated video signals, the blocks of associated audio signals and the formatted subcode signals by affixing a SYNC signal to the signals, for example, and converts the signals to serial form. The channel encoder 16 supplies the signals to a recording head for recording onto a recording medium.

FIGS. 2A and 2B show a recording format for the signals formed by the processing circuit shown in FIG. 1. A plurality of helically recorded tracks form one picture frame, as shown in FIG. 2A. In the NTSC format, a frame is recorded in ten tracks, and in the PAL format a frame is recorded in 12 tracks. FIG. 2B shows the recording format for one track of the frame. The track is bounded by margins, and starting from the left most margin, which represents the recording start end, there are recorded an audio area, a video area and a subcode area. Inter-block gaps, which serve as a margin for editing and for prevention of overwriting of data, are provided between these areas.

FIGS. 3A–3D show the respective areas of one track in greater detail. The audio area, shown in FIG. 3B, is comprised of a pre-amble sector, which includes a run-up block and a pre-sync block, an audio sector and a post-amble sector, which includes post-sync and guard area blocks. The pre- and post-sync blocks include a 2 byte sync region formed by a recording signal modulating circuit (not shown) using 24 to 25 conversion, and a 3 byte ID region formed by an ID data adding circuit (not shown).

The ID region is divided into an ID0 byte, an ID1 byte and an IDP byte. The ID0 bytes, shown in greater detail in FIGS. 4A and 4B, store data such as application data bits AP1 or AP2, for indicating the data format of the sync blocks, sequencing data bits SEQ for identifying the frame number (which is useful during a variable speed playback mode) and track data bits TRACK for identifying the track number of the frame. The ID1 bytes, also shown in FIGS. 4A–4B, store sync data. The IDP byte (not shown) stores parity data.

The audio sector of the audio area, shown in FIG. 5A, is divided into 9 sync blocks of 77 bytes each. The audio sync blocks include 5 bytes of AAUX signal data, 72 bytes of audio signal data, and 8 bytes of inner parity data C1. FIG. 5B illustrates one of the nine audio sync blocks. The lower five sync blocks (shown in FIG. 5A) C2 are parity sync blocks and include outer parity data and inner parity data.

The video area, shown in FIG. 3C, includes a pre-amble sector, which includes run-up and pre-sync regions, a video sector, and a post-amble sector, which includes post-sync and guard area regions. As in the audio sector, the video sector is divided into sync blocks and each sync block includes 2 bytes of sync data and 3 bytes of ID data, shown in FIG. 6. The pre-sync blocks and the post-sync block are structured in a manner similar to the pre- and post-sync blocks of the audio sector.

The video sector of the video area is shown in detail in FIG. 6 and includes 149 sync blocks. Sync blocks α, β and γ, shown in greater detail in FIG. 7A, are VAUX sync blocks and store the accompanying video information signals. The 135 remaining sync blocks, shown in FIG. 6, include video data as well as inner parity data and form buffering units BUF0 to BUF26. The eleven sync blocks C2 are parity sync blocks and include both outer parity data and inner parity data.

FIG. 7C illustrates a buffering unit formed of five sync blocks, each comprised of the 77 bytes of video data shown in FIG. 7B. The first byte is a Q data byte in which quantization data is stored. Following the Q byte, are 76 bytes of video signal data.

The AAUX region of the audio sector of the audio area shown in FIG. 5B and the VAUX region of the video sector of the video area shown in FIG. 7A are each formed of "packs", shown in FIG. 8. The first byte PC0 of the pack serves as a pack header (ITEM) and the remaining bytes, PC1–PC4, serve as pack data.

The ITEM data is divided into upper 4-bit data and lower 4-bit data. The upper 4-bit data identifies what is referred to as a "large" item, and the lower 4-bit data identifies what is referred to as a "small" item. The upper 4-bit "large" item and the lower 4-bit "small" item define the format and content of the succeeding data. There are at most 16 "large" items, and for a respective "large" item, there are at most 16 "small" items.

The large items identified by the upper 4 bits of the item data include, as shown in FIG. 9, control [0000], title [0001], chapter [0010], part [0011], and program [0100] items. Line item [0101] indicates data recorded during a vertical blanking period. Other items include the video auxiliary (VAUX) data [0110], the audio auxiliary (AAUX) data [0111] and soft mode data [1111], which is designated for software applications. Large items [1000] to [1110] are reserved items for future applications.

The pack structure of the three VAUX sync blocks α, β and γ of the video sector of the video area are shown in FIG. 10. Each VAUX sync block includes 15 5-byte packs, for a total of 45 packs per track. Similarly, nine 5-byte packs are recorded in the AAUX regions of the audio sector shown in FIG. 5A.

FIG. 11 shows the VAUX pack data structure of one frame. In an NTSC frame consisting of 10 tracks, there is a total of 450 VAUX regions, 45 per track. Of the 45 VAUX regions in each track, 6 are designated as main VAUX regions, numbered 60–65, and the remaining are designated as optional regions. In the main VAUX regions, there are recorded packs of information regarding basic data common to all tapes.

The VAUX packs formed by the VAUX large item [0110] and its respective small items include the VAUX SOURCE pack [0110 0000] (the hexadecimal representation of which is "60"), the VAUX SOURCE CONTROL pack [0110 0001] ("61"), the VAUX REC DATA pack [0110 0010] ("62"), the VAUX REC TIME pack [0110 0011] ("63") and the VAUX REC TIME BINARY GROUP pack [0110 0100] ("64").

The VAUX SOURCE CONTROL pack [0110 0001] ("61"), shown in FIG. 12B, includes a Serial Copy Management System (SCMS) code which includes copy protection information for restricting the number of times the video signals are to be copied. The upper ("copy protect") bit of the SCMS code indicates whether copying of the video signals is permitted and has a value "0" when copying is permitted and a value "1" when copying is not permitted. The value of the lower ("original") bit of the SCMS code indicates whether the video signals stored in the recording medium is the original copy ("0") or not ("1").

The VAUX SOURCE CONTROL pack also includes flag code "REC ST" which indicates whether or not a recording signal is the starting point for recording. "REC MODE" indicates whether a recorded item is an original or an after-recorded item. "FF" is a flag which indicates whether or not the video signal is a 1-field signal that is repeated to form a frame. Flag "FS" indicates whether or not the record is an odd-order field, and flag "FC" indicates whether or not the video data in a present frame is identical to the video data in the immediately preceding frame. Flag "IL" indicates whether or not the recording signal is interlaced. "ST" is a flag which indicates whether or not the recording signal is a still picture signal, and "SC" is a flag which indicates whether or not the image content to be recorded is a still picture that is reproduced with the tape travel of the reproducing VTR temporarily stopped. "BCSYS" represents the aspect ratio. "GENRE CATEGORY" is a code which represents the genre of a recorded item.

The AAUX packs formed by the AAUX large item [0101] and its respective small items include the AAUX SOURCE pack [0101 0000] (the hexadecimal representation of which is "50"), the AAUX SOURCE CONTROL pack [0101 0001] ("51"), the AAUX REC DATA pack [0101 0010] ("52"), the AAUX REC TIME pack [0101 0011] ("53") and the AAUX REC TIME BINARY GROUP pack [0101 0100] ("54").

The AAUX SOURCE CONTROL pack [0101 0001] ("51"), shown in FIG. 12A, includes the "SCMS" code which includes copy protection information for restricting the number of times the audio signals are to be copied. The upper ("copy protection") bit and the lower ("original") bit of the SCMS code exhibit the same values described above with reference to the VAUX SOURCE CONTROL pack shown in FIG. 12B.

The subcode area, shown in FIG. 3D, includes a preamble sector, a subcode sector, and a post-amble sector. The format of the subcode area is shown in detail in FIG. 13A and is further divided into 12 sync blocks 0–11, each shown in FIG. 13B. Each sync block includes 2 bytes of sync data, 3 bytes of ID data, 5 bytes of subcode pack data, and 2 bytes of parity data.

FIG. 14 is a block diagram of a reproducing side of a digital recording and reproducing device of the type described in the aforenoted application. As shown in FIG. 14, signals reproduced from the recording medium by a reproducing head (not shown) are supplied to a channel decoder 25 which converts the signals from series to parallel form and then demodulates them. The channel decoder 25 delivers the demodulated signals to an error correcting circuit 27 via a time base correcting circuit (TBC) 26. The error correcting circuit 27 error corrects the signals or, if too many errors are present in a portion of the signals, appends an error flag to that portion. The error correcting circuit 27 supplies the error corrected signals to a shuffling circuit 28 which temporarily stores the signals and rearranges the video portion of the signals into the above-described buffering units or, if an error flag is appended to the signals, replaces that portion of the signals with the buffering units of an immediately preceding portion stored in the frame memory of the shuffling circuit.

The shuffling circuit 28 supplies the shuffled signals to a switching circuit 6, comprised of a demultiplexing circuit or, preferably, a multiplexing/demultiplexing circuit, which separates the signals into signals representing the above-described video, audio and subcode areas, divides the video area signals into blocks of video signals and into blocks of VAUX signals and divides the audio area signals into blocks of audio signals and blocks of AAUX signals. The blocks of VAUX signals and the blocks of AAUX signals are formed of, for example, the packs shown in FIG. 8.

The switching circuit 6 supplies the blocks of video signals to a deframing circuit 29 which decomposes the blocks of video signals into variable length encoded video signals which are then supplied to a decoding circuit 30. The decoding circuit 30 variable length decodes and inverse quantizes the variable length encoded video signals and then supplies the decoded and dequantized signals to an inverse DCT (IDCT) circuit 31 which decompresses and supplies the decompressed video signals to a de-blocking/de-shuffling circuit 32. The de-blocking/de-shuffling circuit 32 supplies the de-shuffled video signal to a D/A conversion circuit 33 which converts the de-shuffled video signal to an analog composite video signal which is comprised of, for example, a Y signal, a R-Y signal, and a B-Y signal. The analog video signal is supplied to an output terminal and, as an example, is delivered to a display device where a reproduced image is displayed.

The switching circuit 6 supplies the blocks of audio signals to a de-interleaving circuit 34 which operates in a complementary manner to interleave circuit 8 of FIG. 1 and further processes the audio signals which then are supplied to D/A conversion circuit 35 for output as an analog audio signal.

The switching circuit 6 also supplies the blocks of VAUX and AAUX signals to an AUX data decoder 24 which decodes the accompanying audio and video information and supplies the decoded information to microprocessor 10 which performs various controlling operations as a function of the accompanying audio and video information.

The switching circuit 6 further supplies the subcode signals to a subcode data decoder 36 which decodes information from the subcode data and supplies the decoded information to the microprocessor 10.

FIG. 15 is a block diagram of a signal processing circuit of the reproducing side of a digital recording and reproducing device of the type described in copending application Ser. No. 08/384,878 which includes the circuit shown in FIG. 14. As shown in FIG. 15, the signal processing circuit processes signals reproduced from the recording medium for output as analog audio and video signals and also is adapted to transmit the reproduced signals over a digital transmission line via a digital interface. In FIG. 15, those components which are the same as those shown in FIG. 14 are identified by the same reference numerals and further description thereof is omitted.

The shuffling circuit 28 of FIG. 15 shuffles signals derived from the reproduced signals, as described above with reference to FIG. 14, and supplies the shuffled signals to a packetizing circuit 17 which arranges the shuffled signals into packets of predetermined size. The packets are delivered to a parity generator circuit 18 which adds parity data that is used at the remote end of the digital transmission line for detecting communication errors. The parity generator 18 supplies the packets and the parity data to a driver circuit 19 which channel codes the packets and the parity data into signals that are suitable for transmission over the digital transmission line, which may be, for example, twisted pair cable, and then serially transmits the signals over the digital transmission line via the digital interface.

FIG. 16 is a block diagram of the recording side of a known digital recording and reproducing device of the type described in the aforementioned application and which includes the circuit shown in FIG. 1 herein and in which the signals transmitted by the circuit shown in FIG. 15, for example, are received and processed for recording onto a recording medium. The apparatus shown in FIG. 16 may be connected to the remote end of the digital transmission line mentioned in connection with the signal processing circuit of FIG. 15. In FIG. 16, those components which are the same as those shown in FIG. 1 are identified by the same reference numerals and further description thereof is omitted.

As shown in FIG. 16, the signals transmitted by the signal processing circuit of FIG. 15 over the digital transmission line are received via a digital interface and supplied to a receiver circuit 21 which converts the serially transmitted signals to parallel encoded signals and then channel-decodes the signals to recover the packets. The receiver circuit 21 delivers the decoded packets to an error detecting circuit 22 which determines whether an error is present in the packets and, when an error is detected, appends an error flag to the packet. The detecting circuit 22 supplies the packets to a depacketizing circuit 23 which arranges the packets into blocks of associated video signals, blocks of associated audio signals and formatted subcode signals and delivers the signals to the switching circuit 6.

The switching circuit 6 separates the blocks of associated video signals into blocks of video signals and into blocks of VAUX signals and separates the blocks of associated audio signals into blocks of audio signals and blocks of AAUX signals for further processing by deshuffling circuit 14, parity generator 15 and channel encoder 16, for example, for subsequent recording onto a recording medium. The blocks of VAUX signals and the blocks of AAUX signals are formed of, for example, the packs shown in FIG. 8.

The switching circuit 6 also supplies the blocks of VAUX and AAUX signals to the AUX data decoder 24 which decodes accompanying audio and video information from the blocks of AAUX and VAUX signals and supplies the decoded accompanying audio and video information to the microprocessor 10 which performs various controlling operations. The microprocessor 10 delivers accompanying audio and video information to the AUX data generating circuit 11 for further processing as described above with reference to FIG. 1.

FIG. 17 is a block diagram of the recording side of a digital recording and reproducing device of the type described in the aforementioned application in which analog composite video signals are received and processed for digital recording onto the recording medium as well as for transmission over a digital transmission line. The analog composite video signals include video information and copy protection information, the latter being disposed in the vertical blanking period of the video signal for restricting the number of times the video information may be copied. FIG. 17 includes the circuit shown in FIG. 1 as well as the circuit shown in FIG. 15 which is used to transmit digital video signals over the digital transmission line and those components which have been described previously are identified by the same reference numerals.

As shown in FIG. 17, the input analog composite video signal is supplied to the A/D processing circuit 1 for further processing as described above with reference to FIG. 1. The analog composite video signal is also supplied to a vertical blanking (VBLK) signal decoder circuit 9 which decodes the copy protection information present in the vertical blanking period of the analog video signal and delivers the copy protection information to the microprocessor 10. The microprocessor 10 determines whether copying of the video information is permitted based on the copy protection information and, if copying is permitted, generates SCMS code comprising updated copy protection information that indicates that the video information was copied. The microprocessor 10 delivers the SCMS code to the AUX data generating circuit 11 which generates blocks of accompanying audio and video signals which include, for example, the packs of VAUX and AAUX signals shown in FIGS. 12A–12B and having the SCMS code. The AUX data generating circuit 11 supplies the blocks of accompanying audio and video signals to the switching circuit 6 which combines the blocks of audio signals and the blocks of accompanying audio signals to form the blocks of associated audio signals and combines the blocks of video signals and the blocks of accompanying video signals to form the blocks of associated video signals which are delivered to the deshuffling circuit 14 and further processed, as described above with reference to FIG. 1, for recording in a digital recording medium. The blocks of associated video signals, the blocks of associated audio signals and the formatted subcode signals are also supplied by the switching circuit 6 to the packetizing circuit 17 and further processed, as described above with reference to FIG. 15, for transmission over the digital transmission line via the digital interface.

FIG. 18A–18C illustrate various arrangements for dubbing a recording of, for example, video and audio information, stored on an original recording medium, such as a tape, onto one or more copy media using, for example, the recording and reproducing devices shown in FIGS. 1 and 14–17. The recording includes copy protection information for restricting the number of times that the recording may be copied, or dubbed.

FIG. 18A illustrates dubbing an original recording in which the copy protection information included therein permits the original recording to be copied. As shown in FIG. 18A, the original recording stored on a tape 40 is reproduced by a reproducing circuit 41, such as is shown FIGS. 14 or 15, and is outputted as analog audio and video signals to a recording circuit 42, such as the type shown in FIG. 17. Because copying is permitted, the reproduced recording is further processed for recording onto a copy recording medium 43. Alternatively, the reproduced recording may be outputted as digital audio and video signals via a digital transmission line from reproducing circuit 41 to the recording circuit 42 for further processing and recording onto the copy recording medium 43.

FIG. 18B illustrates the attempted dubbing of an original recording in which the copy protection information included therein does not permit copying of the original recording. The original recording stored on a tape 45 is reproduced by a reproducing circuit 46 and because copying is not permitted, the reproduced recording is not outputted to a recording circuit 47. Alternatively, the reproduced recording is outputted by the reproducing circuit 46 to the recording circuit 47, which may be of the type shown in FIG. 17, but because copying is not permitted, the recording circuit 47 does not record the reproduced recording supplied thereto onto a copy recording medium 48.

A drawback of the above-described recording and reproducing circuits is best explained in conjunction with FIG. 18C, which illustrates the attempted concurrent dubbing of an original recording onto first and second copy recording media and in which the copy protection information included in the original recording on tape 50 permits copying from the original recording but does not permit copying from a copy of that original recording. As shown in FIG. 18C, the original recording stored on tape 50 is reproduced by a reproducing circuit 51 and because copying of the original recording is permitted, the original recording is outputted to a recording and transmission circuit 52. Circuit 52 generates updated copy protection information that indicates that the video information was copied once and cannot be further copied, and this updated copy protection information is recorded with the reproduced recording onto a copy recording medium 53. Circuit 52 also transmits the updated copy protection information with the reproduced recording to the recording circuit 54, and because the updated copy protection information indicates that further copying is not permitted, the recording circuit 54 cannot record the reproduced recording onto another copy recording medium 55. As a result, concurrent dubbing of an original recording onto two or more copy recording media is not possible.

OBJECTS OF THE INVENTION

Therefore, an object of the present invention is to provide a technique for recording and reproducing video signals which avoid the aforementioned disadvantages.

Another object of the present invention is to provide apparatus and methods for recording and reproducing video signals which contain copy protection information that restricts the number of times the video information may be copied.

A further object of the present invention is to provide apparatus and methods to concurrently dub from an original recording onto one or more copies video signals that include copy protection information which restricts the number of times the video signals may be is copied.

Various other objects, advantages and features of the present invention will become readily apparent from the ensuing detailed description, and the novel features will be particularly pointed out in the amended claims.

SUMMARY OF THE INVENTION

In accordance with an aspect of this invention, an apparatus records and transmits digital video signals derived from input video signals in which the input video signals include video information and accompanying copy protection information for restricting copying of the video information. Blocks of digital video signal are produced in response to the input video signal, and copy protection signals are generated from the copy protection information detected in the input video signal. First accompanying signals, which include the copy protection information, are generated as a function of the copy protection signals and are combined with the blocks of digital video signals and transmitted over an interface. Second accompanying signals, which include updated copy protection information to indicate that the video information is being copied, are generated as a function of the copy protection signals and are combined with the blocks of digital video signals for recording onto a recording medium.

As a feature of the present invention, the digital video signals which are recorded as well as the digital signals which are received have a recording format which includes a video signal recording area that contains the video information and the accompanying signals, the latter including the copy protection information. The received digital video signals are decoded into blocks of video signals and into blocks of first accompanying signals; and the blocks of first accompanying signals are decoded to generate the copy protection signals. The second accompanying signals are generated as a function of the decoded copy protection signals and include the updated copy protection information which are combined with the blocks of video signals and recorded onto the recording medium.

As another feature of the present invention, the blocks of video signals which were combined with the first accompanying signals and transmitted over the interface are received and decoded into blocks of video signals and into blocks of first accompanying signals. The blocks of first accompanying signals are decoded to generate copy protection signals, and the second accompanying signals, which include updated copy protection information indicating that the video information is being copied, are generated as a function of the copy protection signals. The received and decoded blocks of video signals are combined with the second accompanying signals and recorded onto a recording medium.

In accordance with an additional aspect of the present invention, header signals are generated as a function of the copy protection signals and are transmitted and recorded with the combined blocks of digital video signals and accompanying signals.

In accordance with a still further aspect of the present invention, the header signals transmitted with the digital video signals are decoded at the receiving apparatus into copy protection signals from which second accompanying signals are generated to include the updated copy protection information. The received blocks of digital video signals are combined with these second accompanying signals and recorded onto the recording medium.

In accordance with a still additional aspect of the present invention, a digital video signal is formed from the blocks of video signals and converted to a composite video signal, and second copy protection signals are generated as a function of the first copy protection signals and are combined with the composite video signal to form output composite video signals that may be transmitted in analog form.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 2A–2B are diagrams showing a recording format of one frame of digital data;

FIGS. 3A–3D are diagrams showing the recording format of FIG. 2 in greater detail;

FIGS. 4A–4B are diagrams showing in detail the preamble and postamble areas of the audio area of FIG. 3;

FIG. 8 is a diagram showing the pack data structure of a universal pack;

FIG. 9 is a diagram showing the "large" items of the pack headers;

FIG. 11 is a diagram showing the main data regions and the optional data regions of the VAUX signals of a frame of the video area;

FIGS. 12A–12B are diagrams showing the respective formats of the AAUX and VAUX SOURCE CONTROL packs;

FIG. 14 is a block diagram showing a reproducing circuit of a the recording and reproducing device described in the aforementioned application;

FIG. 17 is a block diagram showing another recording and transmitting circuit of the recording and reproducing device described in the aforementioned application;

FIGS. 18(a)–18(c) are block diagrams illustrating various dubbing arrangements;

FIG. 22 is a diagram showing the format of a header packet $H_0$ used in the present invention;

FIG. 23 is a diagram showing a predefined sequence of packets transmitted by this invention;

DETAILED DESCRIPTION OF THE PREFERRED EMBODIMENTS

The present invention records and reproduces video signals, which include video information and copy protection information for restricting the number of times the video information may be copied, and permits the video information that is reproduced from an original recording to be dubbed concurrently onto one or more copies.

Figure 19:
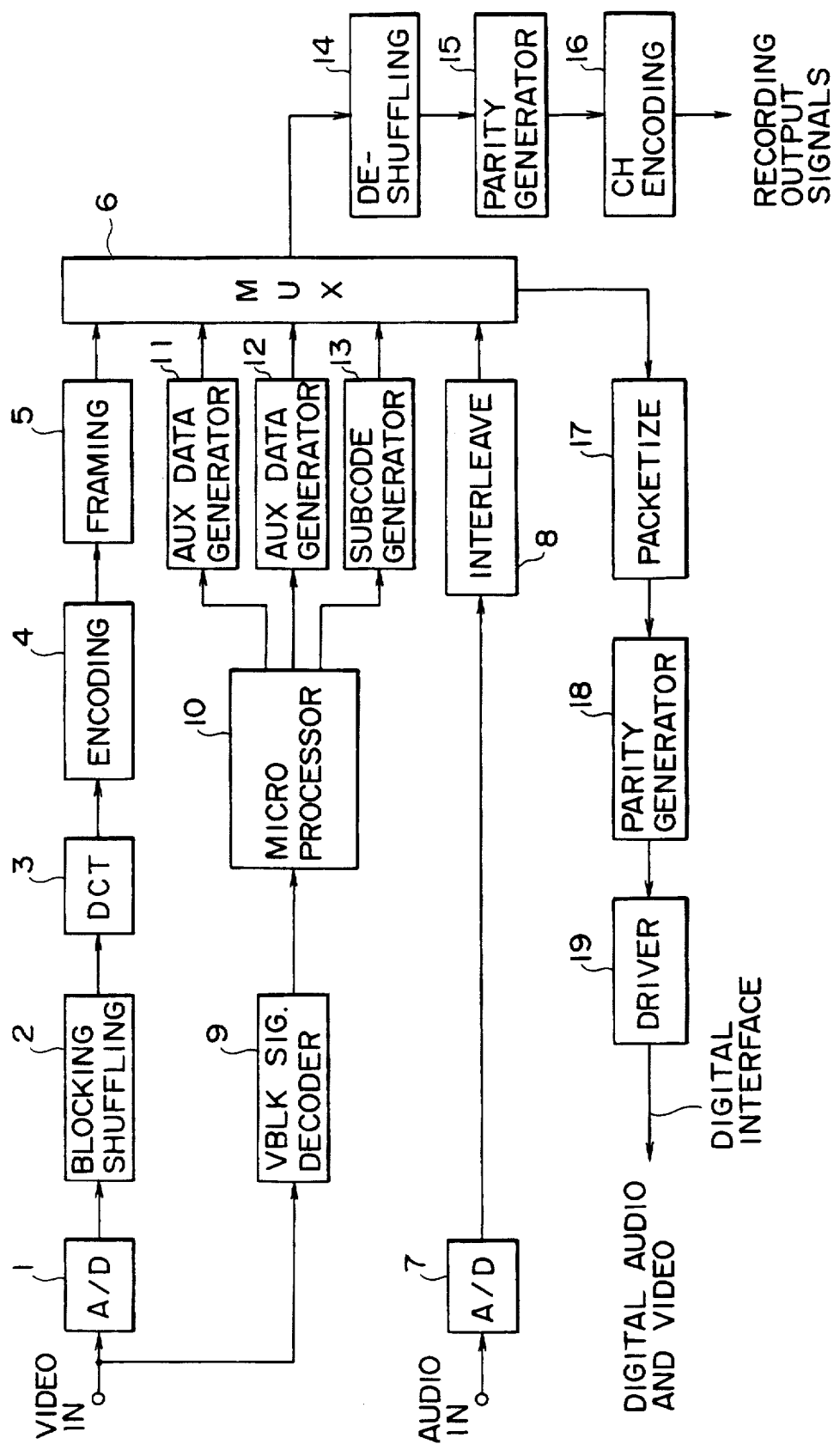
FIG. 19 is a block diagram showing a recording and transmitting circuit of a recording device incorporating an embodiment of the present invention.

FIG. 19 is a block diagram of a signal processing circuit of the recording and transmitting side of a digital recording and reproducing device according to a first embodiment of the present invention. In FIG. 19, those components which have been described above are indicated by the same reference numerals and in the interest of brevity, further description thereof is omitted.

The circuit shown in FIG. 19 receives input analog composite video signals, which include video information and copy protection information, and input analog audio signals, which include audio information, and concurrently processes the input signals for digital recording onto a first recording medium and for transmission over a digital transmission line. The recorded audio and video signals include updated copy protection information which indicates that the input audio and video signals have been copied, and the transmitted audio and video signals include the original copy protection information so that the transmitted signals, or at least the information represented by the transmitted signals, subsequently may be recorded onto a second recording medium.

As shown in FIG. 19, the input analog composite video signal is supplied to the A/D processing circuit 1 and to the vertical blanking (VBLK) signal decoder circuit 9. As discussed above, the VBLK signal decoder circuit 9 decodes the copy protection information in the vertical blanking period of the video signal and delivers the copy protection information to a microprocessor 10 which determines therefrom whether copying of the video information is permitted. If copying is permitted, the microprocessor 10 generates a first SCMS code comprising updated copy protection information to indicate that the video information was copied and delivers this SCMS code to a first AUX data generating circuit 11. The first AUX data generating circuit 11 generates blocks of first accompanying video signals comprised of, for example, the packs of VAUX signals shown in FIG. 12B which include the SCMS code, and the blocks of first accompanying video signals are supplied to the switching circuit 6. The switching circuit combines the blocks of video signals and the blocks of first accompanying video signals and couples the combined signals to the deshuffling circuit 14 for further processing and subsequent recording on a first digital recording medium.

Figure 1:
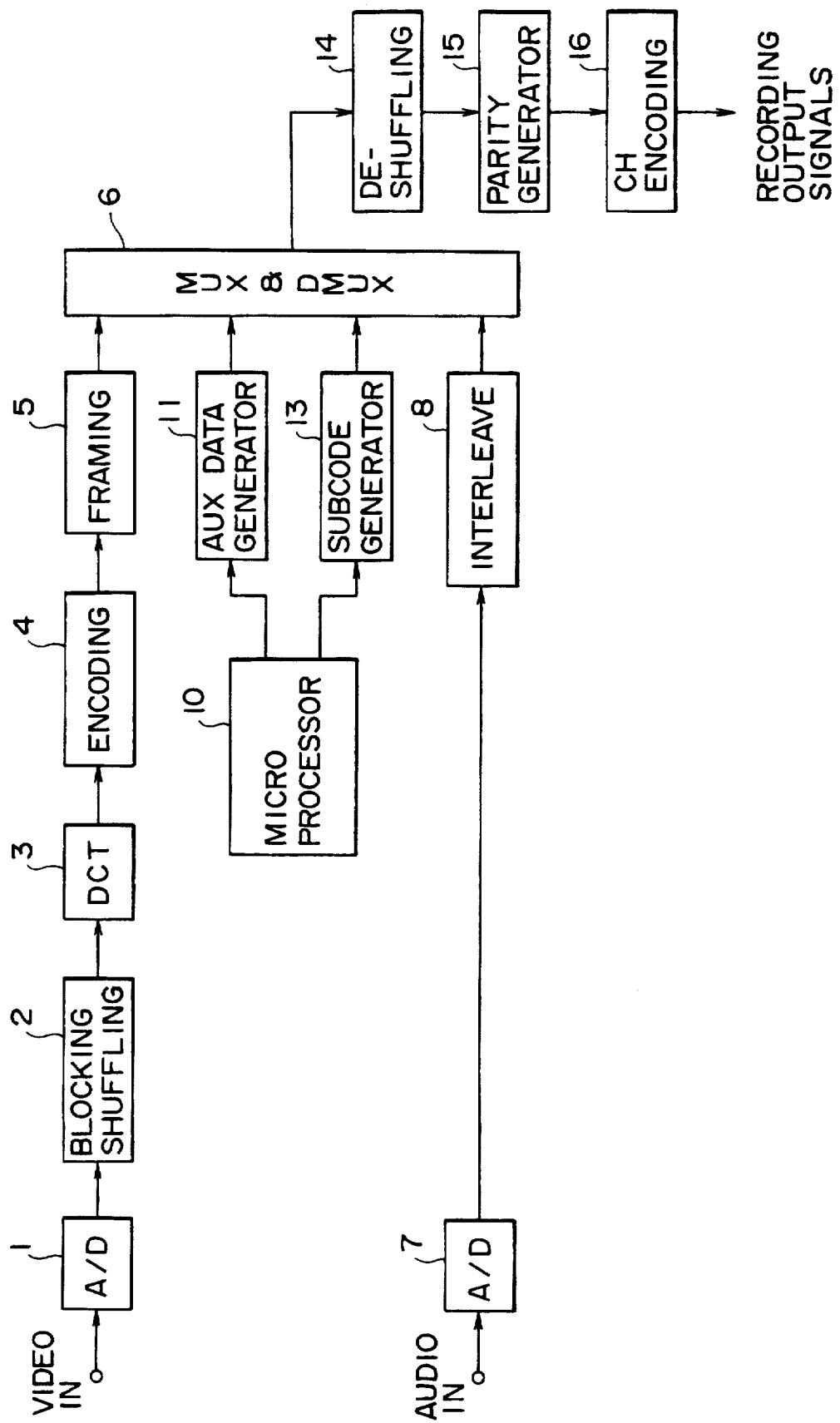
FIG. 1 is a block diagram showing a recording circuit of a recording and reproducing device of the type described in the aforementioned application.

The microprocessor 10 also generates a second SCMS code comprising the original copy protection information of the input analog composite video signal, if that copy protection information indicates that copying is permitted, and delivers the second SCMS code to a second AUX data generating circuit 12. The second AUX data generating circuit generates blocks of accompanying video signals formed of, for example, the packs of VAUX signals shown in FIG. 12B and which include the second SCMS code, and these blocks of accompanying video signals are supplied to the switching circuit 6 for transmission to (as opposed to recording by) another device. The switching circuit couples the blocks of video signals and the blocks of accompanying video signals, as well as the interleaved audio signals, the accompanying audio signals and the formatted subcode signals described with reference to FIG. 1, to the packetizing circuit 17 for further processing, as described with reference to FIG. 17, and subsequent transmission over a digital transmission line via a digital interface.

Figure 16:
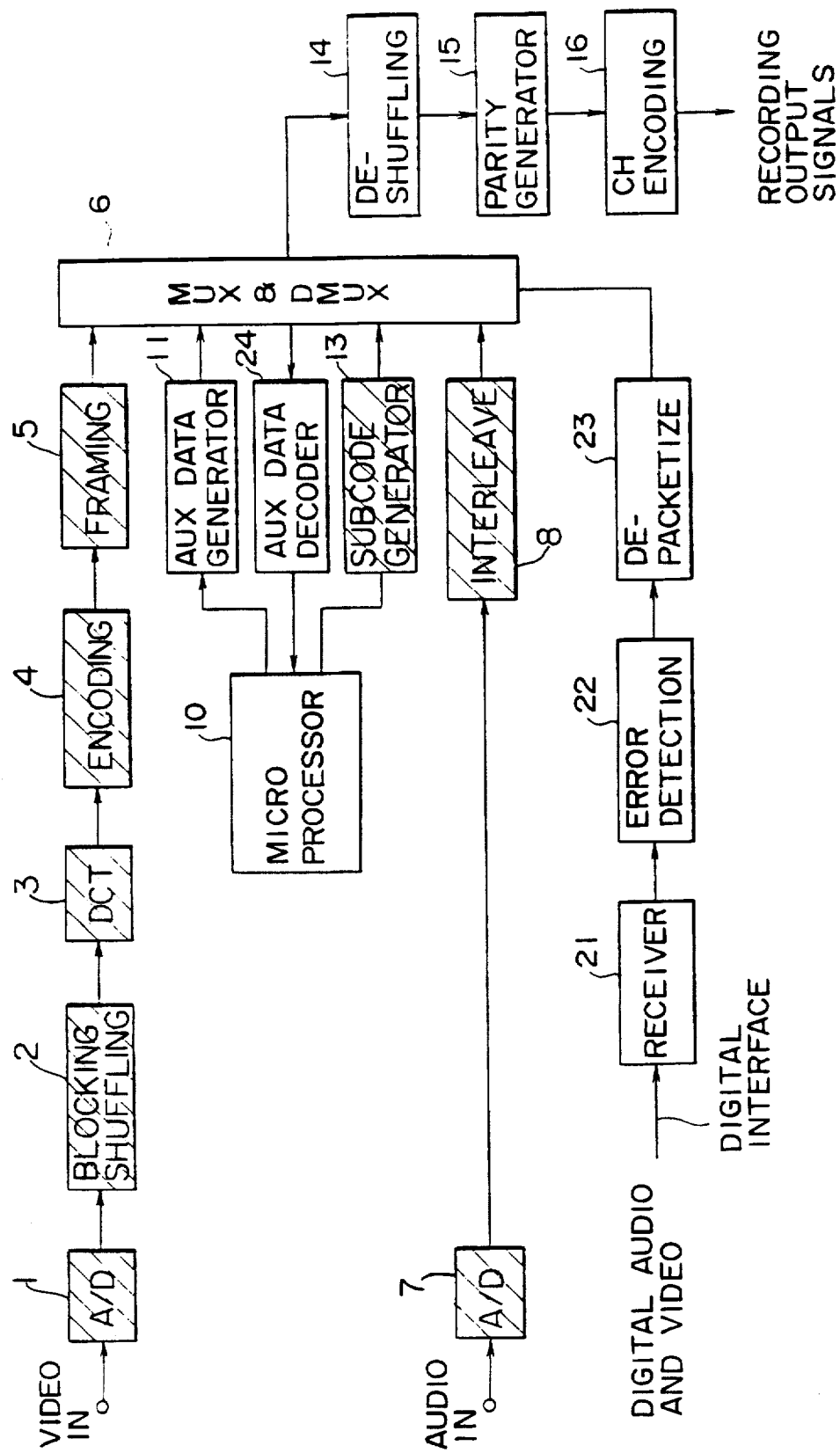
FIG. 16 is a block diagram showing a recording circuit of the recording and reproducing device described in the aforementioned application having a digital interface.
Figure 20:
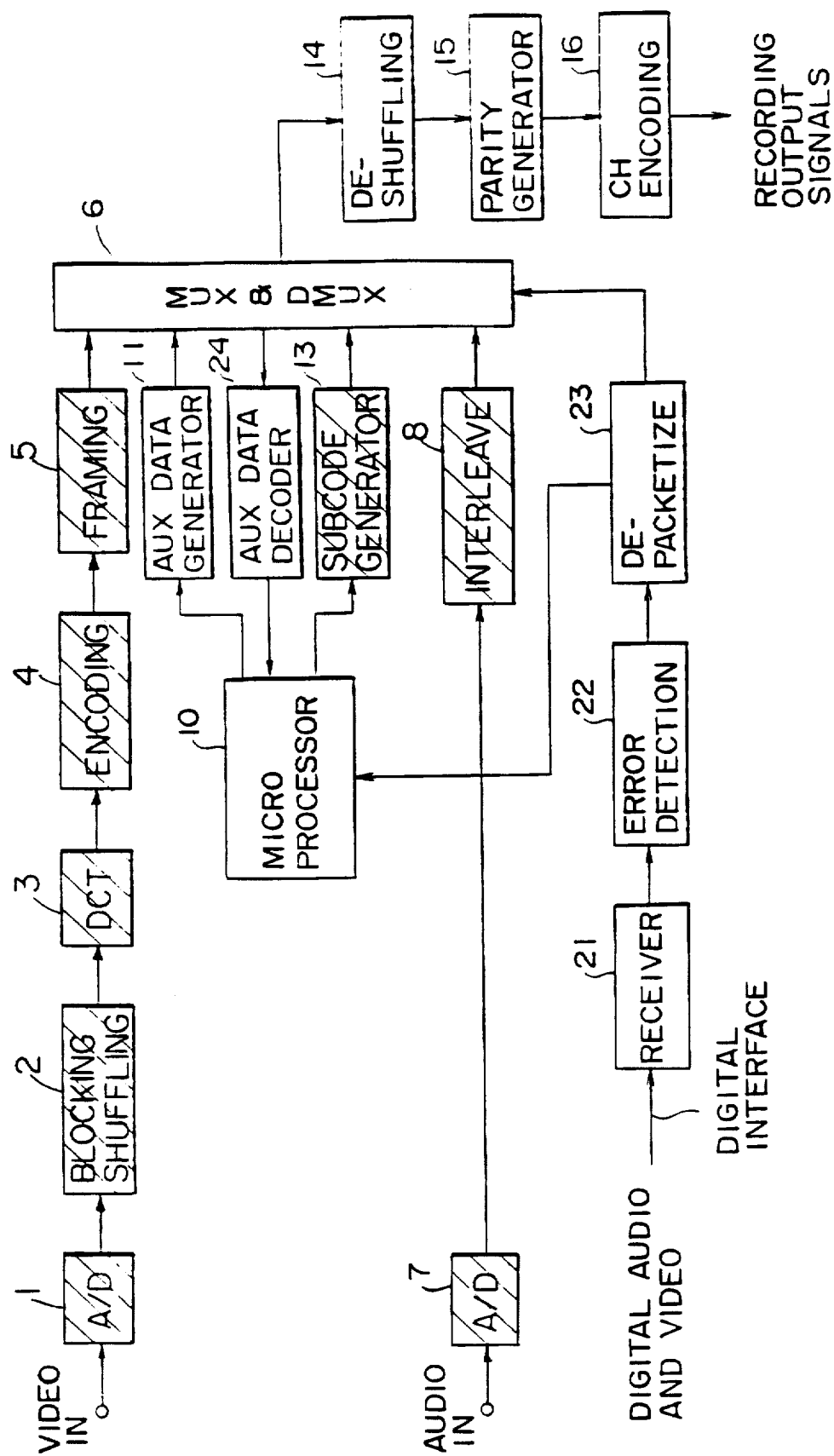
FIG. 20 is a block diagram showing a receiving and recording circuit of a recording device incorporating an embodiment of the present invention.

FIG. 20 is a block diagram of another signal processing circuit that may be disposed at the receiving and recording side of a digital recording and reproducing device. This circuit receives the digital video signals that are transmitted by the circuit shown in FIG. 19 over the digital transmission line and processes those signals for recording onto a digital recording medium. It is appreciated that the received digital video signals include video information and copy protection information. As shown in FIG. 20, blocks of video signals and blocks of accompanying video signals, which are derived from the received digital video signals as described above in conjunction with FIG. 16, are delivered by a depacketizing circuit 23 to the switching circuit 6.

Here, the switching circuit supplies the blocks of received accompanying video signals to the AUX data decoder 24 which decodes the copy protection information from those blocks and supplies the copy protection information to microprocessor 10. The microprocessor interprets the copy protection information to determine whether copying of the received video information is permitted and, if so, generates an updated SCMS code comprising updated copy protection information that indicates that the video information was copied. The updated SCMS code is supplied from the microprocessor to the AUX data generating circuit 11 which generates blocks of second accompanying video signals formed of, for example, the packs of VAUX signals shown in FIG. 12B and containing the updated SCMS code. The blocks of second accompanying video signals are supplied to the switching circuit 6 which combines the blocks of received digital video signals and the blocks of second accompanying video signals and delivers the combined signals to the deshuffling circuit 14 for further processing and recording on the digital medium as described above with reference to FIG. 16.

The circuits shown in FIGS. 19 and 20 are operable to dub an original recording concurrently onto two or more copy media. As an example, the signal processing circuit shown in FIG. 19 preferably arranged as the recording and transmission circuit 52 in FIG. 18C and the signal processing circuit shown in FIG. 20 preferably is arranged as the recording circuit 54, thereby permitting an original recording (in which the accompanying copy protection information permits the copying of the original recording but does not permit copying from a copy) onto first and second copy media. As shown in FIG. 18C, the original recording on recording medium 50 is reproduced by reproducing circuit 51 and is outputted as analog audio and video signals to the recording and transmission circuit 52, which includes the circuit shown in FIG. 19. The recording and transmission circuit 52 generates updated copy protection information that indicates that the video information was copied and records this updated copy protection information along with the reproduced recording onto first copy recording medium 53. The recording and transmission circuit 52 also transmits the original copy protection information with the reproduced recording over the digital transmission line to the recording circuit 54, which includes the circuit shown in FIG. 20. Because the original copy protection information indicates that further copying is permitted, the recording circuit 54 records the so reproduced recording onto second copy recording medium 55 along with the updated copy protection information.

Figure 21:
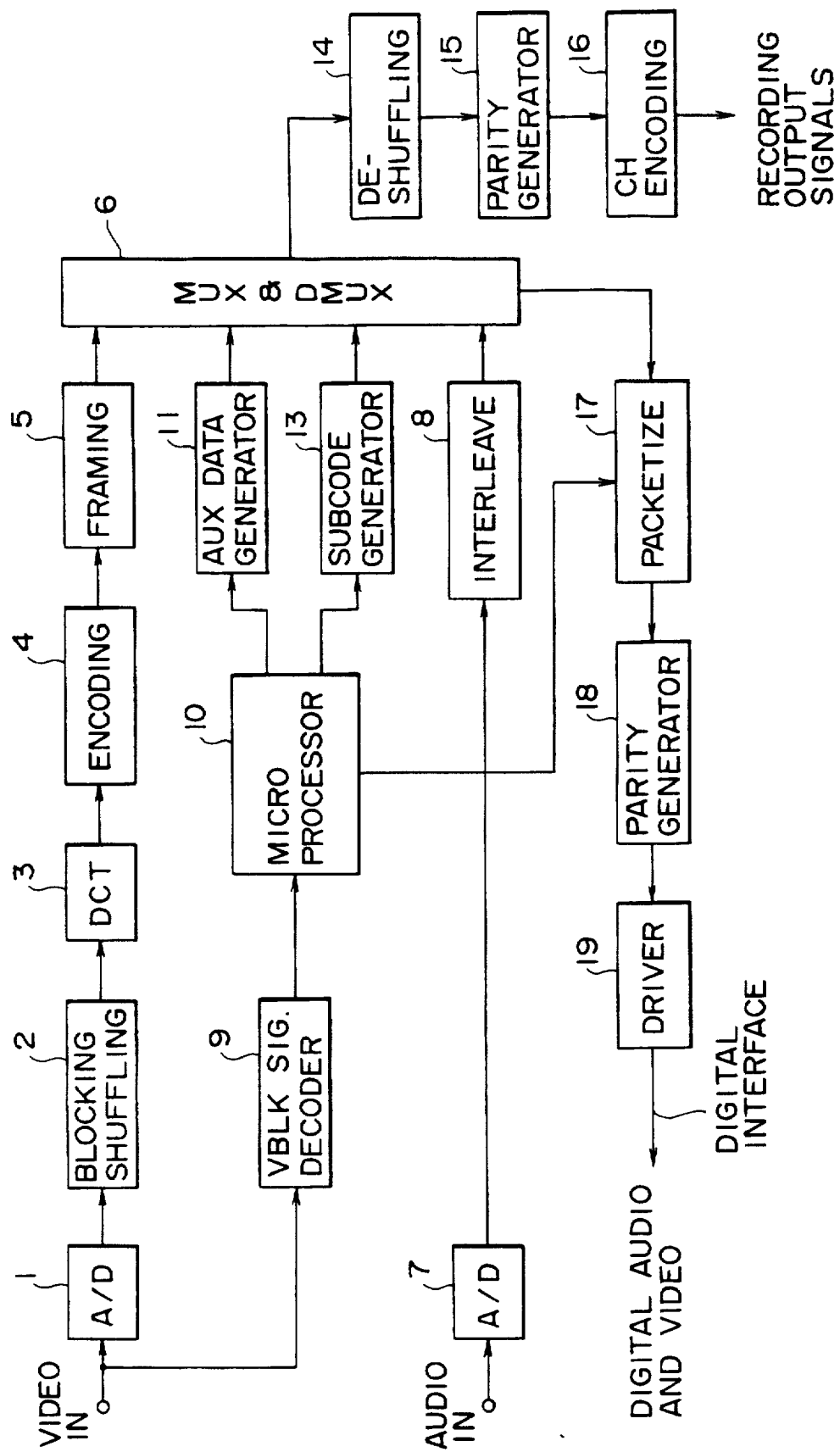
FIG. 21 is a block diagram showing a recording and transmitting circuit of a recording device incorporating an embodiment of the present invention.

FIG. 21 is a block diagram of a signal processing circuit of the recording and transmitting side of a digital recording and reproducing device according to another embodiment of the present invention. The circuit shown in FIG. 21 processes input analog composite video signals, which include video information and copy protection information, as well as input analog audio signals, which include audio information, for recording onto a digital recording medium and for concurrent transmission over a digital transmission line. The recorded audio and video signals, as well as the transmitted audio and video signals, include updated copy protection information which indicates that the audio and video signals have been copied. The transmitted audio and video signals also include header signals formed of the original input copy protection information so that the transmitted audio and video information subsequently may be recorded onto a second recording medium.

As shown in FIG. 21, an input analog composite video signal is supplied to A/D processing circuit 1 for digital conversion, and to vertical blanking (VBLK) signal decoder circuit 9. The VBLK signal decoder circuit decodes the copy protection information included in the vertical blanking period of the input video signal and supplies the copy protection information to microprocessor 10. The microprocessor determines from the copy protection information whether copying of the video information is permitted and, if so, generates a first SCMS code comprising updated copy protection information that indicates that the video information was copied. The microprocessor. couples this first SCMS code to the AUX data generating circuit 11 which generates blocks of accompanying video signals comprised of, for example, the packs of VAUX signals shown in FIG. 12B and which include the first SCMS code, and the blocks of accompanying video signals are supplied to the switching circuit 6. The switching circuit combines the blocks of video signals (received from framing circuit 5) and the blocks of accompanying video signals and supplies the combined signals to the deshuffling circuit 14 for further processing and subsequent recording onto the digital recording medium.

The microprocessor 10 further generates a second SCMS code comprised of the original copy protection information, if that information indicates that copying is permitted, and supplies the second SCMS code to packetizing circuit 17. The microprocessor also instructs the packetizing circuit to generate a header packet $H_0$ which includes the original copy protection information and has the format shown in FIG. 22. As shown, the second SCMS code is stored in the second and third most significant bits of bytes 5 and 6 of the header packet $H_0$ and represents the copy protection information of the video signal. Alternatively, the second SCMS code is stored in the second and third most significant bits of the sixth byte of the header packet $H_0$.

Figure 5A:
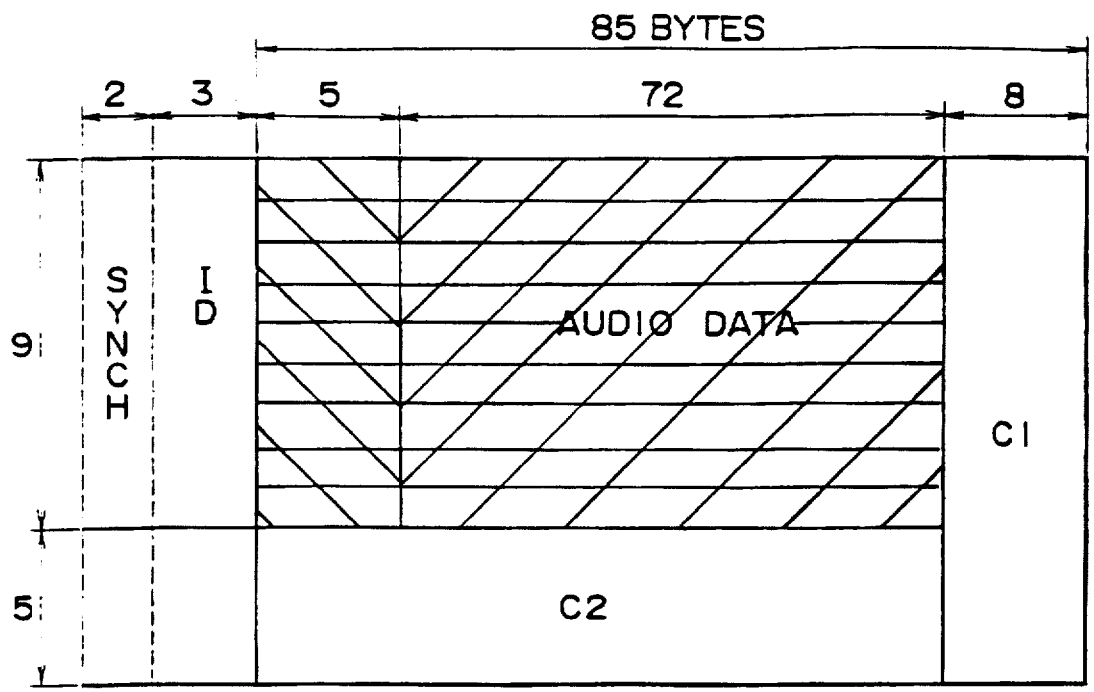
FIGS. 5A–5B are diagrams showing in detail the audio area of FIG. 3.
Figure 5B:
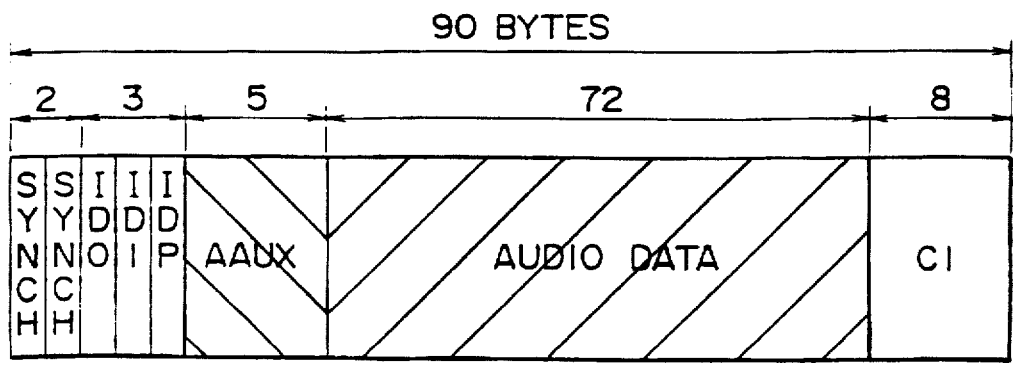
Figure 6:
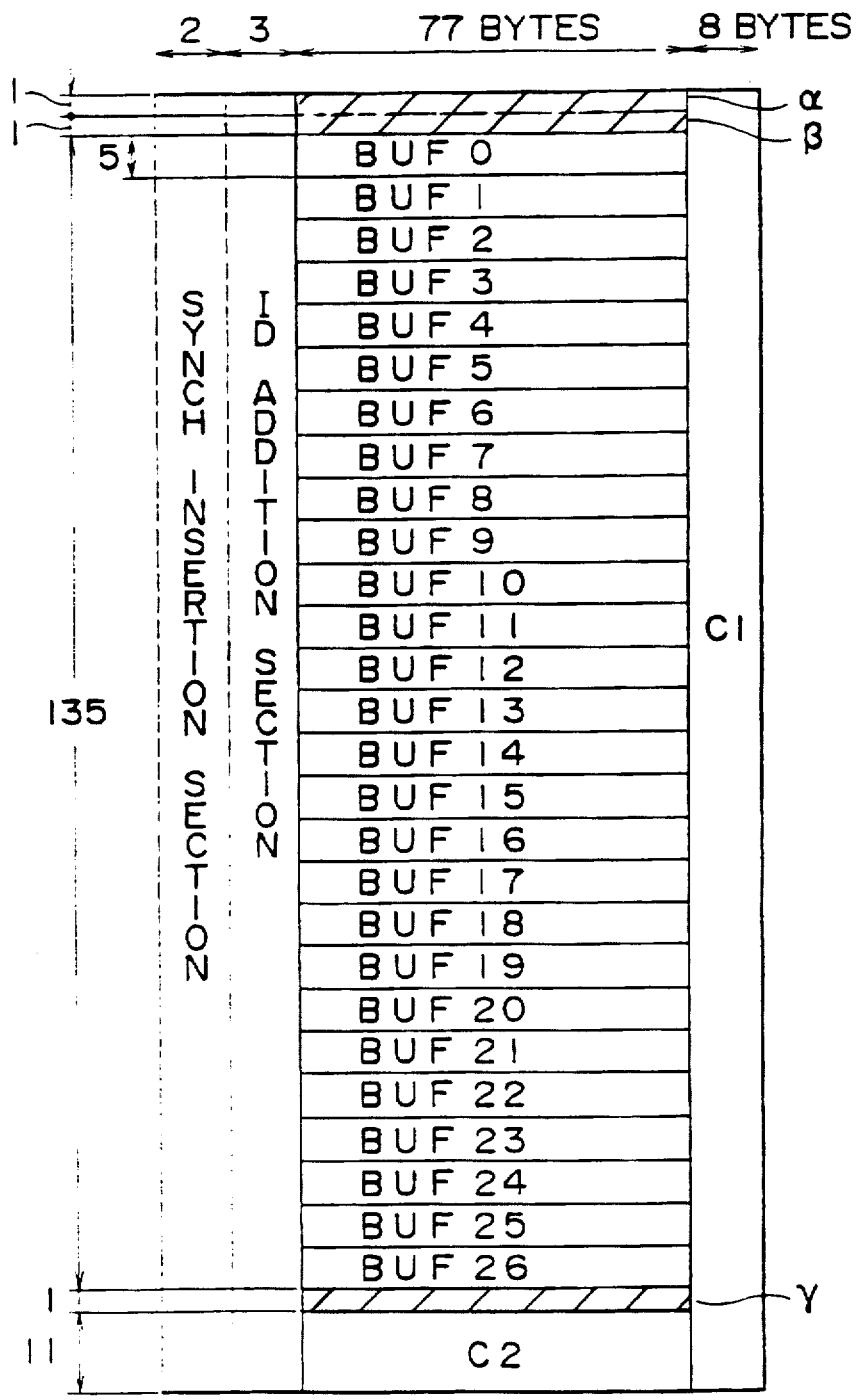
FIG. 6 is a diagram showing a recording format of a video area of FIG. 3.
Figure 7A:
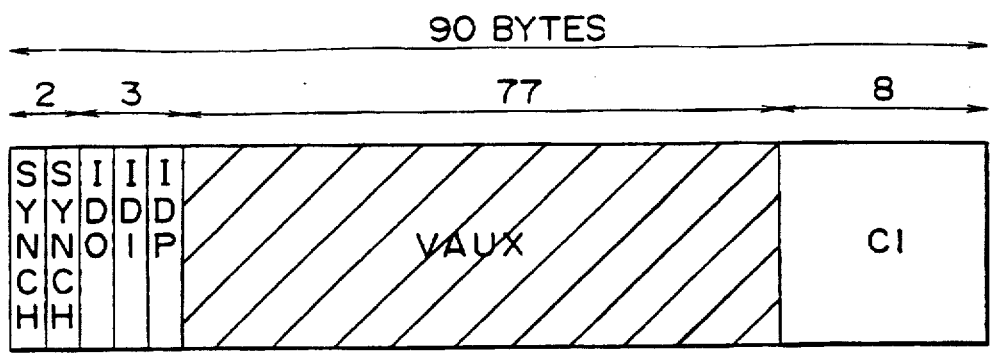
FIGS. 7A–7C are diagrams respectively showing one sync block of VAUX data, one sync block of video data and a plurality of video sync blocks of the video area of FIG. 6.
Figure 7B:
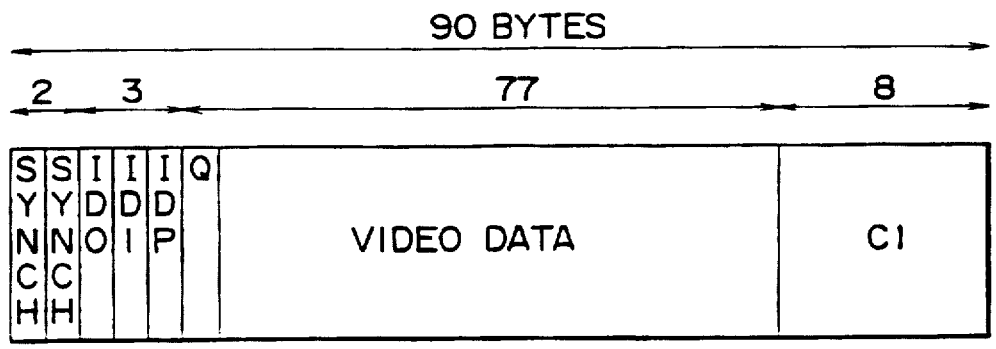
Figure 7C:
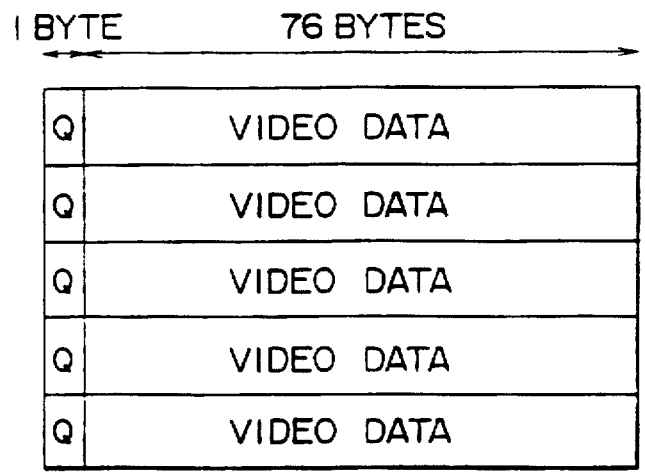
Figure 10:
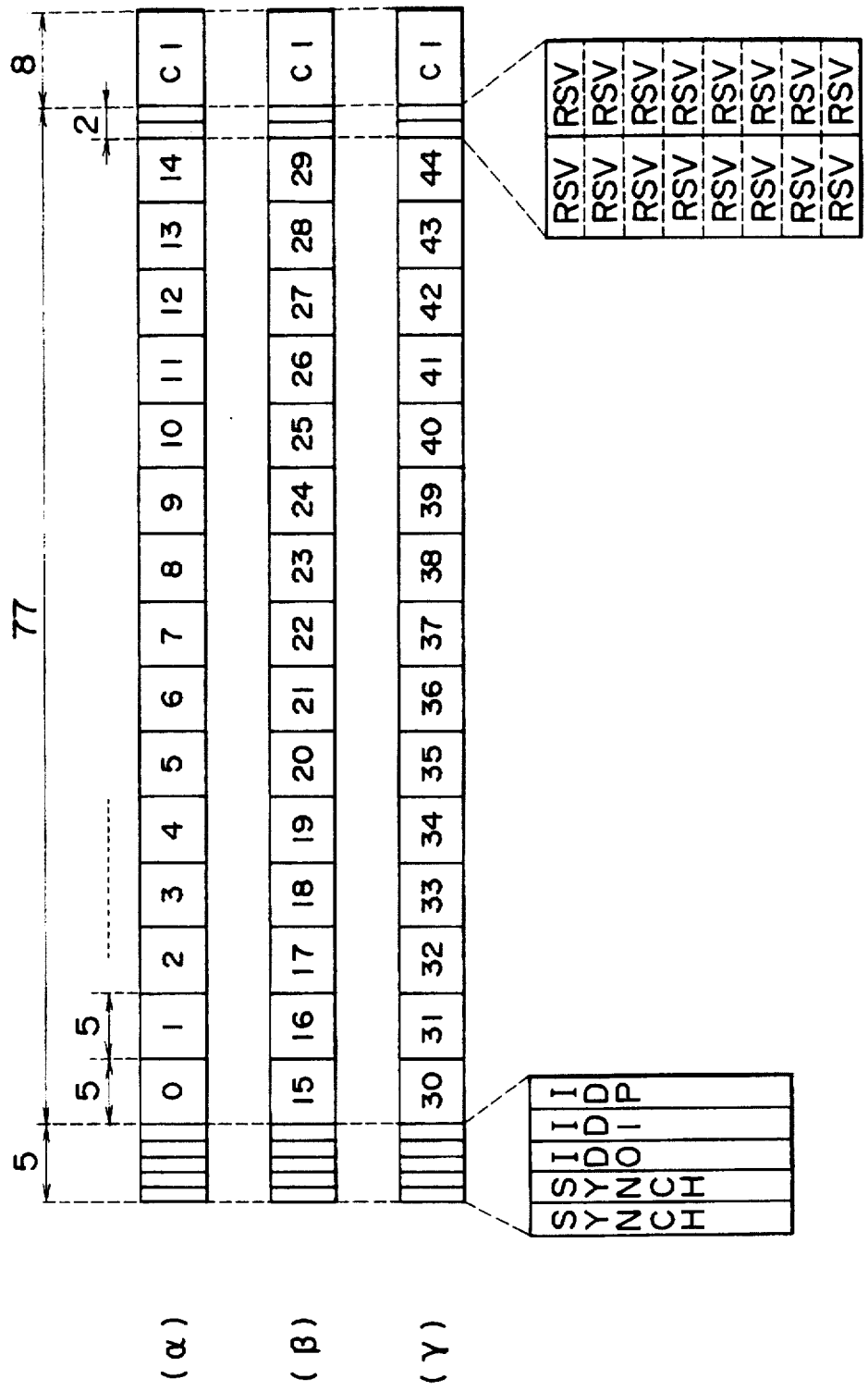
FIG. 10 is a diagram showing in further detail the data structure of the VAUX data of the video area shown in FIG. 6.
Figure 13A:
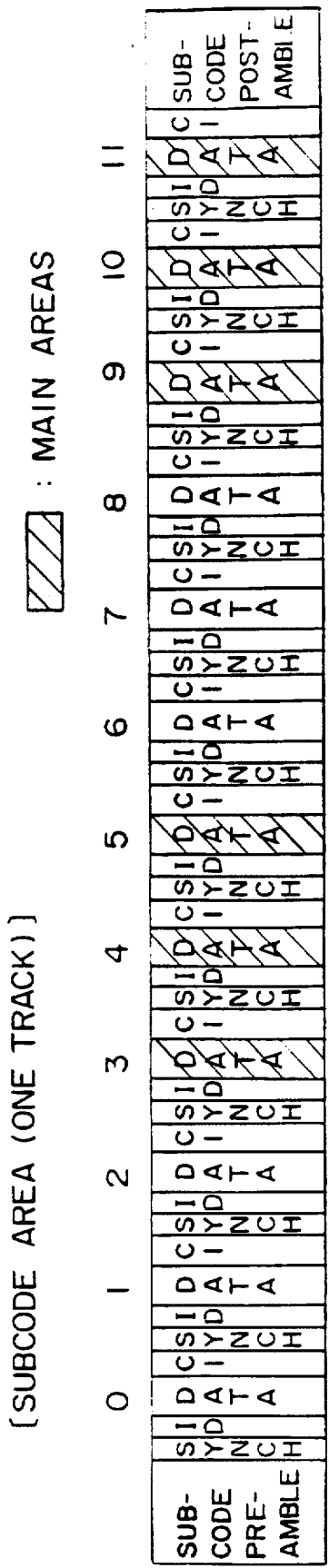
FIGS. 13A–13B are diagrams showing a recording format of the subcode area of FIG. 3.
Figure 13B:
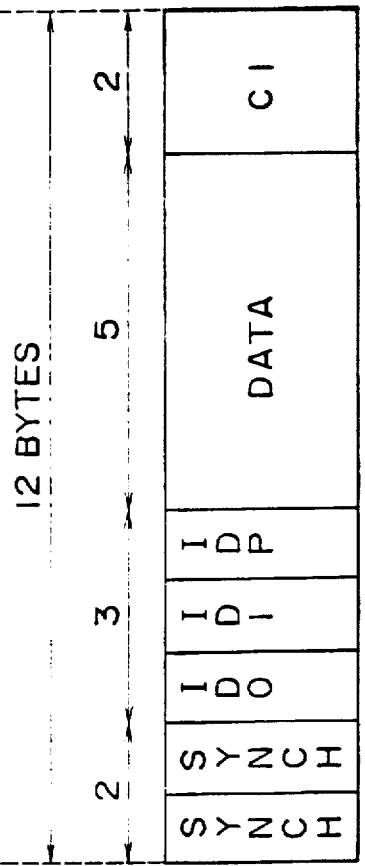
Figure 15:
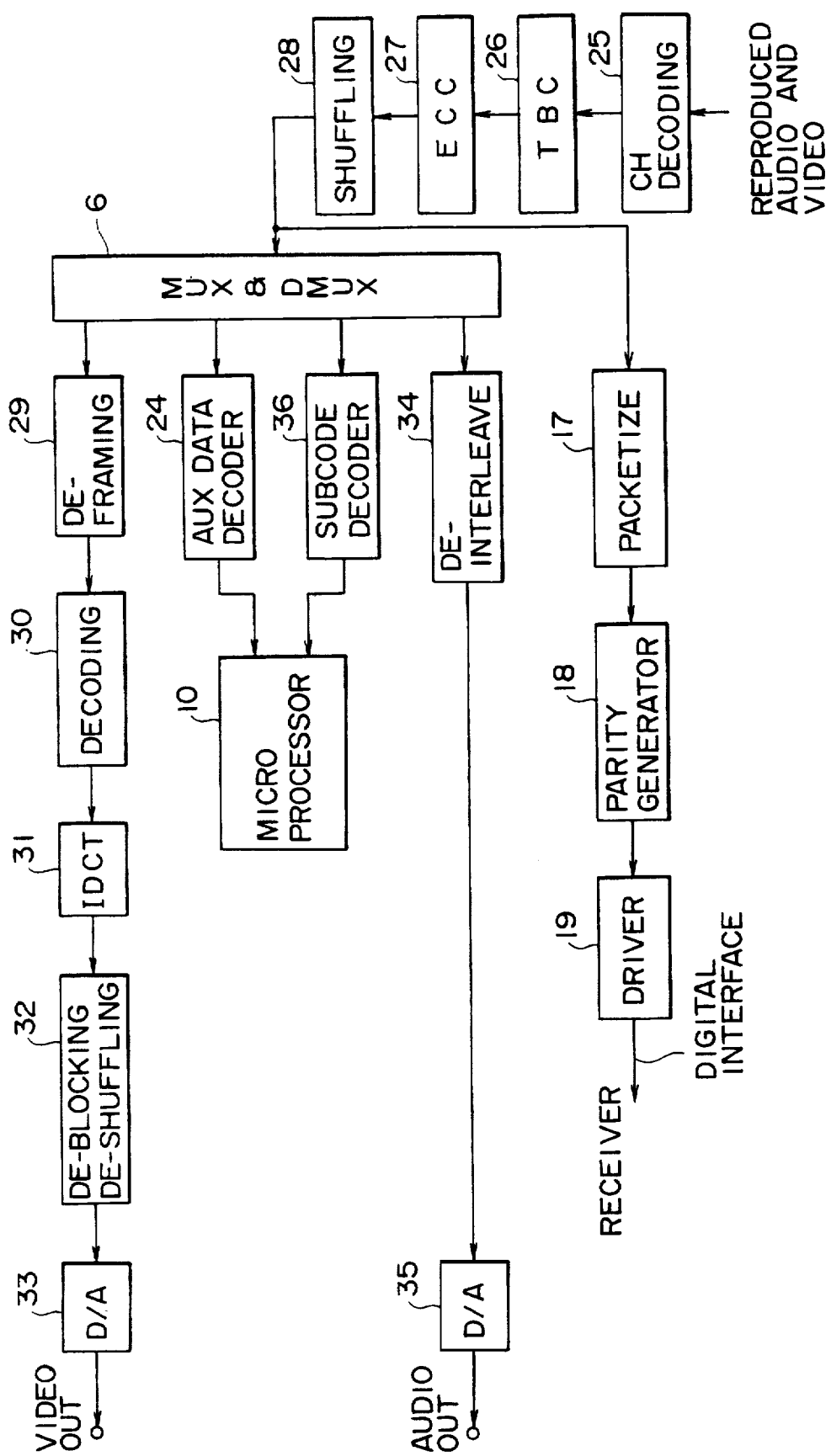
FIG. 15 is a block diagram showing a reproducing circuit of the recording and reproducing device of FIG. 14 having a digital interface.

The switching circuit 6 also supplies the blocks of video signals derived from the input video signals and the accompanying video signals generated by AUX data generator 11, as well as the interleaved audio signals, the accompanying audio signals and the formatted subcode signals described above with reference to FIG. 1, to the packetizing circuit 17. The packetizing circuit arranges the signals into packets and appends the packets to the header packet $H_0$ in the predefined sequence shown in FIG. 23. As shown, in FIG. 23, the packets representing one track of a video frame are arranged in the sequence $H_0$, $SC_0$, $SC_1$, $VA_0$, $VA_1$, $VA_2$, $A_0$, $V_0$, $V_1$, $V_2$, ... $V_{14}$, $A_1$, $V_{15}$, $V_{16}$, ... $V_{134}$. Each of the packets $SC_0$ and $SC_1$ includes six of the twelve synch blocks of formatted subcode data shown in FIG. 13; each of the packets $VA_0$, $VA_1$, and $VA_2$ includes one of the three VAUX synch blocks shown in FIG. 10; each of the packets $A_0$, $A_1$ ... $A_8$ includes one of the nine audio synch blocks shown in FIG. 5A; and each of the packets $V_0$, $V_1$ ... $V_{134}$ include one of the 135 video synch blocks shown in FIG. 6. As before, the packetizing circuit 17 supplies the packets to parity generator circuit 18 for further processing, and transmission over the digital transmission line via the digital interface.

Figure 24:
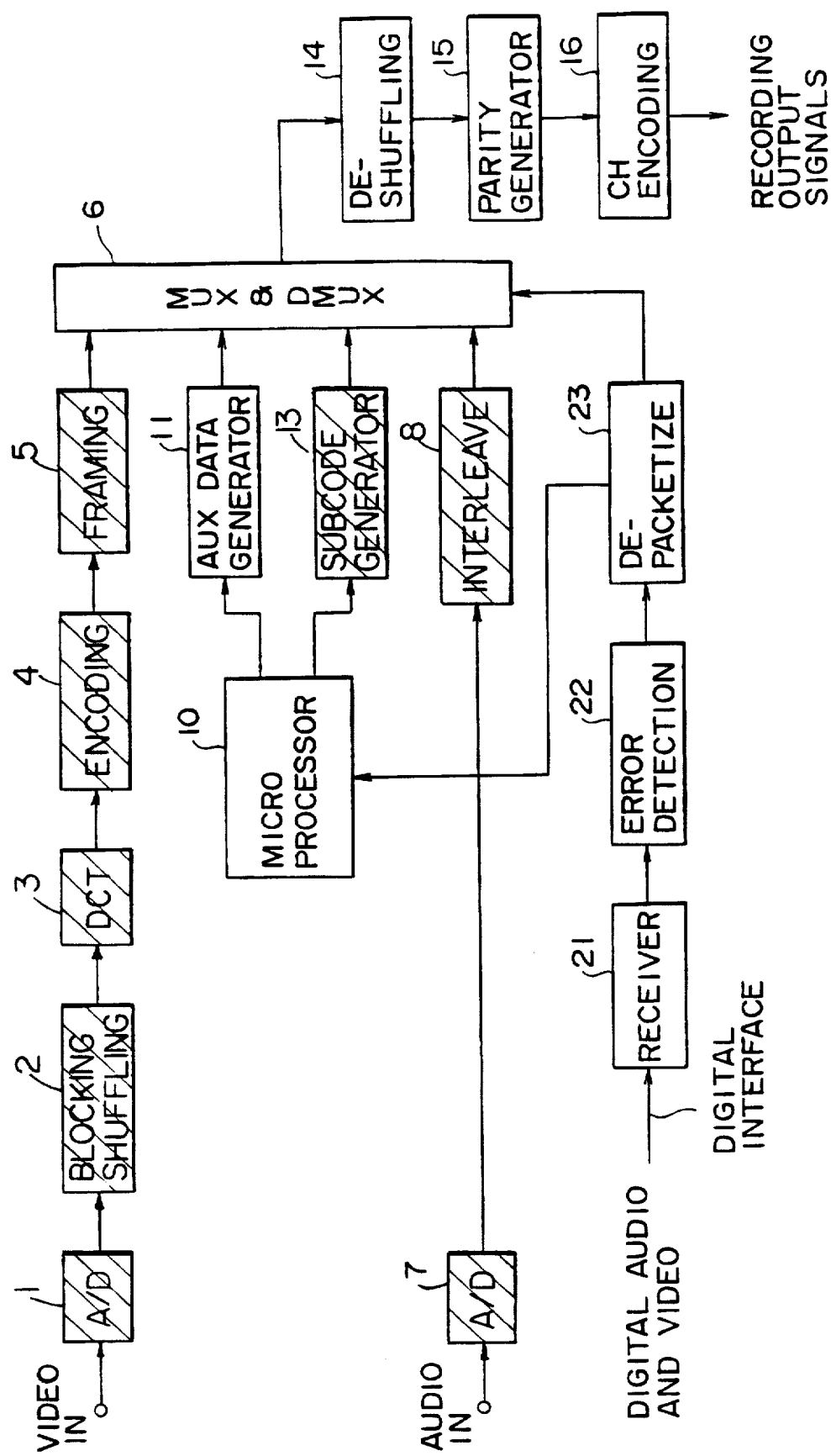
FIG. 24 is a block diagram showing a receiving and recording circuit of a recording device incorporating an embodiment of the present invention.

FIG. 24 is a block diagram of a signal processing circuit of the receiving and recording side of a digital recording and reproducing device compatible with and complementary to the circuit shown in FIG. 21. The digital video signals that are transmitted by the circuit shown in FIG. 21 over the above-described digital transmission line are received and processed for recording onto a digital recording medium. The received digital video signals include video information and copy protection information formed of the packets $SC_0$ ... $V_{134}$ shown in FIG. 23. These packets are received by receiver circuit 21, error detected by error detecting circuit 22, and converted to blocks of received video signals and blocks of accompanying video signals by depacketizing circuit 23 which are supplied to switching circuit 6. The depacketizing circuit 23 also converts the header packet $H_0$ into the second SCMS code, comprised of the original copy protection information, which is coupled to the microprocessor 10.

The microprocessor interprets the original copy protection information included in the header packet $H_0$ to determine whether copying of the video information is permitted, and if so, generates an updated SCMS code formed of updated copy protection information that indicates that the video information was copied. The microprocessor couples the updated SCMS code to the AUX data generating circuit 11 which generates blocks of accompanying video signals formed of, for example, the packs of VAUX signals shown in FIG. 12B and having the updated SCMS code. The AUX data generating circuit supplies the generated blocks of accompanying video signals to the switching circuit 6 which combines these blocks with the blocks of video signals and couples the combined signals to the deshuffling circuit 14 for further processing and subsequent recording onto the digital recording medium.

Alternatively, if the received copy protection information indicates that copying of the video information is permitted, the microprocessor instructs the switching circuit 6 to combine the blocks of received video signals and the received blocks of accompanying video signals, which include the updated copy protection information, and to supply the combined blocks to the deshuffling circuit 14 for further processing and recording as described above.

The circuits shown in FIGS. 21 and 24 are operable to concurrently dub an original recording onto two or more copies. As an example, the signal processing circuit shown in FIG. 21 is arranged, for example, as the recording and transmission circuit 52, and the signal processing circuit shown in FIG. 24 is arranged as the recording circuit 54 shown in FIG. 18C to copy an original recording onto first and second copy media even if the copy protection information permits the copying of the original recording but does not permit copying from a copy.

Figure 25:
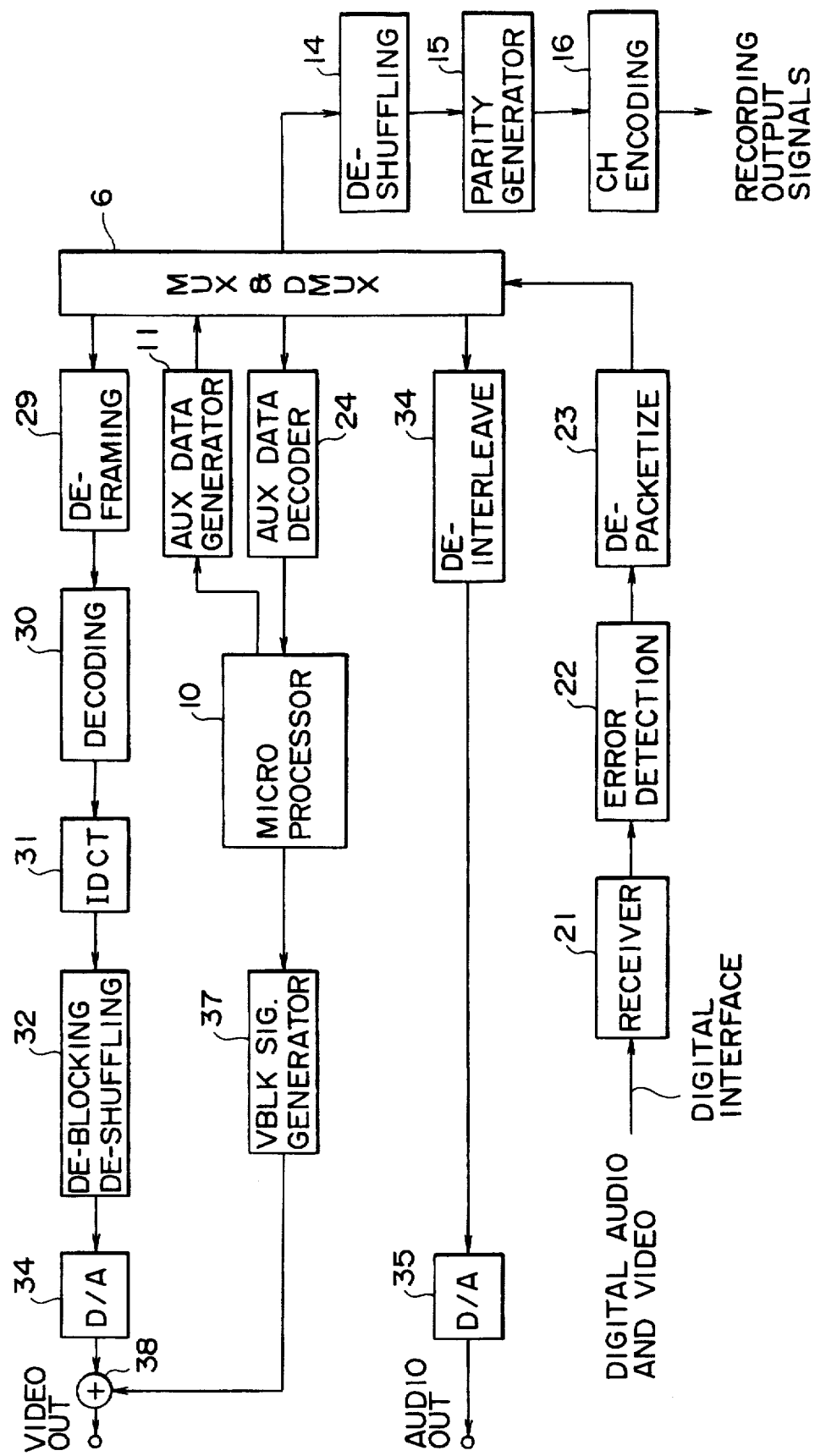
FIG. 25 is a block diagram showing a receiving, recording and transmitting circuit of a recording device incorporating an embodiment of the present invention.

FIG. 25 is a block diagram of another embodiment of a signal processing circuit of the receiving, recording and transmitting side of a digital recording and reproducing device. Digital video signals that are transmitted over a digital transmission line by a signal processing circuit of the type shown in FIG. 19 are received and concurrently processed for recording onto a digital recording medium and for output as analog composite video signals and audio signals. The received video signals include blocks of video signals and blocks of accompanying video signals, which are supplied by depacketizing circuit 23 to the switching circuit 6. The switching circuit delivers the blocks of accompanying video signals to the AUX data decoder 24 which decodes the copy protection information included therein and supplies the copy protection information to the microprocessor 10. The microprocessor determines from the copy protection information whether copying of the video information is permitted and, if so, generates a first SCMS code which comprises updated copy protection information indicating that the video information was copied. The microprocessor supplies this first SCMS code to the AUX data generating circuit 11 which generates blocks of accompanying video signals comprised of, for example, the packs of VAUX signals shown in FIG. 12B and which include the first SCMS code, and supplies the blocks of accompanying video signals to the switching circuit for combining with the blocks of received video signals. The combined signals are coupled to the deshuffling circuit 14 for further processing and subsequent recording onto a digital recording medium.

The switching circuit 6 also supplies the blocks of video signals to deframing circuit 29 for further processing, as described above with reference to FIG. 14, and subsequent delivery to a combining circuit 38 which provides an output analog video signal.

The microprocessor 10 also generates a second SCMS code comprising the original copy protection information, and supplies the second SCMS code to the vertical blanking (VBLK) signal generator 37 which generates an analog copy protection signal based on this second SCMS code and delivers the analog copy protection signal to the combining circuit 38. The combining circuit inserts the analog copy protection signal into the vertical blanking period of the output analog composite video signal which is couple to the output terminal.

The circuits shown in FIGS. 19 and 25 are operable to concurrently dub an original recording onto two or more copies. As an example, the signal processing circuit shown in FIG. 19 is arranged, for example, as the recording and transmission circuit 52 and the signal processing circuit shown in FIG. 25 is arranged as the recording circuit 54 shown in FIG. 18C to copy an original recording, in which the copy protection information permits copying of the original recording but does not permit copying from the copy, onto first and second copy media. As shown in FIG. 18C, the original recording stored on recording medium 50 is reproduced by reproducing circuit 51 and is outputted to the recording and transmission circuit 52 shown in FIG. 19. The recording and transmission circuit 52 generates updated copy protection information that indicates that the video information was copied and records this updated copy protection information with the reproduced recording onto the first copy recording medium 53. The recording and transmission circuit 52 also transmits the original copy protection information with the reproduced recording via the digital transmission line to the recording circuit 54, shown in FIG. 25, and because the original copy protection information indicates that further copying is permitted, the recording circuit 54 records the reproduced recording with the updated copy protection information onto the second copy recording medium 55.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of recording and transmitting digital video signals derived from input video signals, the input video signals including video information and accompanying copy protection information for restricting copying of said video information, comprising the steps of:

producing a digital video signal in response to an input video signal;

forming blocks of video signals from said digital video signal;

detecting said accompanying copy protection information in said input video signal;

generating first copy protection signals substantially equal to said detected accompanying copy protection information;

combining said blocks of video signals with said first copy protection signals into first combined signals;

transmitting said first combined signals;

generating second copy protection signals as a function of said detected accompanying copy protection information, said second copy protection signals including updated copy protection information indicating that said video information is being copied;

combining said blocks of video signals with said second copy protection signals into second combined signals; and recording said second combined signals onto a recording medium.

2. The method of claim 1, wherein said input video signal is a composite video signal and said digital video signal is produced by converting said composite video signal to said digital video signal.

3. The method of claim 1, further comprising the steps of compressing said digital video signal to form a compressed digital video signal; quantizing said compressed digital video signal to form a quantized digital video signal; and variable length coding said quantized digital video signal to form a variable length coded video signal, said blocks of video signals being formed from said variable length coded video signal.

4. The method of claim 1, wherein packs of first accompanying signals including said first copy protection signals are formed and packs of second accompanying signals including said second copy protection signals are formed, said packs being comprised of item data and succeeding data, said item data determining the arrangement and function of said succeeding data.

5. The method of claim 4, wherein said blocks of video signals are combined with said packs of said first accompanying signals to form blocks of first combined signals for transmission, and said blocks of video signals are combined with said packs of said second accompanying signals to form blocks of second combined signals for recording.

6. The method of claim 1, further comprising the steps of inputting an analog audio signal; analog-to-digital converting said analog audio signal to a digital audio signal; interleaving said digital audio signal to form blocks of audio signals; and generating accompanying audio signals; and wherein said blocks of audio signals, said accompanying audio signals, said blocks of video signals and said first copy protection signals are combined to form said first combined signals.

7. The method of claim 1, wherein said second combined signals are arranged in a recording format including a subcode recording area for recording subcode data; and further comprising the steps of generating said subcode data which includes location information to identify a location on said recording medium at which the second combined signals are recorded.

8. The method of claim 1 further comprising the step of determining, as a function of said copy protection information, whether copying of said video information is permitted; and said first copy protection signals are generated and said blocks of video signals are combined with said first copy protection signals into said first combined signals if copying of said video information is permitted.

9. The method of claim 1, wherein said input video signal is a composite video signal and said copy protection information is disposed in a vertical blanking period of said composite video signal.

10. The method of claim 1, wherein each of said copy protection signals includes SCMS code having a copy protect bit and an original bit.

11. The method of claim 1, further comprising the steps of arranging said first combined signals into packets; determining a respective parity value for each of said packets and for appending said respective parity value to each said packet; and encoding said packet and said appended parity value into coded signals for transmission.

12. The method of claim 1, further comprising the steps of determining respective parity values for each of said second combined signals; and encoding said second combined signals and said respective parity values into coded signals for recording.

13. A method of recording digital video signals derived from input video signals, the input video signals including video information and accompanying copy protection information for restricting copying of said video information, the digital video signals being in a recording format which includes a video signal recording area for recording said video information and respective accompanying information, comprising the steps of:

producing said digital video signals in response to said input video signals;

forming blocks of said digital video signals;

detecting said copy protection information in said input video signal;

generating first accompanying signals which includes said detected copy protection information;

combining said blocks of video signals with said first accompanying signals into first combined signals;

transmitting said first combined signals;

receiving said first combined signals;

decoding said first combined signals into said blocks of video signals and blocks of first accompanying signals;

decoding said blocks of first accompanying signals to decode said copy protection information therefrom;

generating updated copy protection signals as a function of said decoded copy protection information, said updated copy protection information indicating that said video information is being copied;

combining said decoded blocks of video signals with said updated copy protection signals into second combined signals; and recording said second combined signals onto a recording medium.

14. The method of claim 13, further comprising the steps of generating additional accompanying signals including said updated copy protection information indicating that said video information is being copied; combining the blocks of digital video signals formed by said block forming means with said additional accompanying signals into third combined signals; and recording said third combined signals onto a second recording medium.

15. A method of recording and transmitting digital video signals derived from input video signals, the input video signals including video information and input copy protection information for restricting copying of said video information, the digital video signals being in a format which includes a video signal area containing said video information and said copy protection information, comprising the steps of:

producing said digital video signals in response to said input video signals;

forming blocks of said digital video signals;

detecting said copy protection information included in said input video signals;

generating updated copy protection signals indicating that said video information is being copied;

combining said blocks of digital video signals with said updated copy protection signals into combined signals;

generating header signals which include said copy input protection information, and appending said combined signals and said header signals to form associated signals;

transmitting said associated signals; and recording said combined signals onto a recording medium.

16. The method of claim 15, wherein said input video signals are composite video signals and said digital video signals are produced by converting said composite video signals to said digital video signals.

17. The method of claim 15, further comprising the steps of:

compressing said digital video signals to form compressed digital video signals;

quantizing said compressed digital video signals; and variable length coding said quantized digital video signals from which said blocks are formed.

18. The method of claim 15, wherein said generated copy protection signals are formed of packs comprised of item data and succeeding data, said item data determining the arrangement and function of said succeeding data.

19. The method of claim 18, wherein said blocks of digital video signals are combined with said packs to form blocks of video signals for transmission and for recording.

20. The method of claim 15, wherein said format includes a subcode area for subcode information, and further comprising the steps of generating subcode data which includes location information to identify a location on said recording medium at which said digital video signals are recorded, and wherein said subcode data is combined with said combined signals.

21. The method of claim 15, further comprising the steps of determining, as a function of said copy protection information, whether copying of said video information is permitted, and said updated copy protection signals are generated and said blocks of digital video signals are combined with said updated copy protection signals into said combined signals if copying of said video information is permitted.

22. The method of claim 15, wherein said input video signal is a composite video signal and said copy protection information is provided in a vertical blanking period of said composite video signal.

23. The method of claim 15, wherein said updated copy protection signals include SCMS code having a copy protect bit and an original bit.

24. The method of claim 15, wherein said header signals include SCMS code having a copy protect bit and an original bit.

25. The method of claim 15, further comprising the steps of:

inputting an analog audio signal;

analog-to-digital converting said analog audio signal to a digital audio signal;

interleaving said digital audio signal to form blocks of digital audio signals; and generating accompanying audio signals; and wherein said blocks of audio digital signals, said accompanying audio signals, said blocks of digital video signals and the updated copy protection signals are combined to form said first combined signals.

26. The method of claim 15, wherein said header signals include first and second SCMS codes each having a copy protect bit and an original bit, said first SCMS code representing video copy protection information and said second SCMS code representing audio copy protection information.

27. The method of claim 15, further comprising the steps of:

arranging said associated signals into packets;

determining a respective parity value for each of said packets and appending said respective parity value to each said packet; and encoding said packet and said appended parity value into coded signals for transmission.

28. The method of claim 15, further comprising the steps of:

determining respective parity values for each of said combined signals; and encoding said combined signals and said respective parity values into coded signals for recording.

29. A method of recording digital video signals derived from received video signals, the recorded digital video signals and the received video signals each having a format which includes header signals containing input copy protection information and a video signal area for video information and respective accompanying information having copy protection information for restricting copying of said video information, comprising the steps of:

decoding said received video signals into said header signals, blocks of video signals and blocks of first accompanying signals and detecting the input copy protection information in said header signals;

generating updated copy protection signals as a function of said detected input copy protection information, said updated copy protection signals indicating that said video information is being copied;

combining said blocks of video signals with said updated copy protection signals into combined signals; and recording said combined signals onto a recording medium.

30. The method of claim 29, wherein the step of decoding includes serial-to-parallel converting said received video signals into parallel converted video signals; channel decoding said parallel converted video signals; and identifying an error in respective ones of said channel decoded signals.

31. The method of claim 29, wherein the step of decoding includes deriving said header signals from said received video signals; and separating said received signals into said blocks of video signals and into said blocks of first accompanying signals.

32. The method of claim 29, wherein said input copy protection information is interpreted to determine whether copying of said video information is permitted; and said updated copy protection signals are generated and said blocks of video signals are combined with said updated copy protection signals when copying is permitted.

33. The method of claim 29, wherein said input copy protection information comprises SCMS code having a copy protect bit and an original bit.

34. The method of claim 29, wherein said header signals include SCMS code having a copy protect bit and an original bit.

35. The method of claim 29, wherein said updated copy protection signals are generated in the form of packs comprised of item data and succeeding data, said item data determining the arrangement and function of said succeeding data.

36. The method of claim 35, wherein said blocks of video signals are combined with said packs to form blocks of associated video signals for recording.

37. The method of claim 29, further comprising the steps of determining respective parity values for each of said combined signals; and encoding said combined signals and said respective parity values into coded signals for recording.

38. A method of recording digital video signals derived from input video signals, the input video signals including video information and input copy protection information for restricting copying of said video information, the digital video signals having a format which includes a video signal area for said video information and said input copy protection information, comprising the steps of:

producing a digital video signal in response to an input video signal;

forming blocks of video signals from said digital video signal;

detecting said input copy protection information in said input video signal;

generating first accompanying signals as a function of said detected input copy protection information;

combining said blocks of video signals with said first accompanying signals into first combined signals;

generating header signals as a function of said detected input copy protection information, said header signals including said input copy protection information, and appending said first combined signals to said header signals to form appended signals;

transmitting said appended signals;

receiving said appended signals;

decoding said received appended signals into said header signals and into said first combined signals and decoding said header signals into copy protection signals; and recording the decoded first combined signals onto a first recording medium.

39. The method of claim 38, further comprising the step of recording said first combined signals onto a second recording medium.

40. The method of claim 38, further comprising the steps of:

generating updated copy protection information in response to the received decoded copy protection signals to indicate that said video information is being copied; and combining the blocks of received video signals with said updated copy protection information for recording.

41. A method of recording digital video signals and outputting composite video signals, each having a format which includes a video signal area for video information and respective accompanying information, the latter having accompanying copy protection information for restricting copying of said video information, comprising the steps of:

decoding received digital video signals to generate blocks of video signals and blocks of first accompanying signals;

detecting received copy protection information in the decoded blocks of first accompanying signals;

generating updated copy protection signals as a function of said detected received copy protection information, said updated copy protection signals indicating that said video information is being copied;

combining the generated blocks of video signals with said updated copy protection signals into combined signals;

recording said combined signals onto a recording medium;

forming a digital video signal from said generated blocks of video signals;

converting said formed digital video signal to an analog composite video signal;

generating copy protection signals in response to said detected received copy protection information; and combining said generated copy protection signals and said analog composite video signal to form output composite video signals.

42. The method of claim 41, wherein the step of decoding includes serial-to-parallel converting said received digital video signals into parallel converted video signals; channel decoding said parallel converted video signals; identifying an error in respective ones of said channel decoded signals; arranging respective packets of said channel decoded signals to form depacketized signals; and separating said depacketized signals into said blocks of video signals and into said blocks of first accompanying signals.

43. The method of claim 41, wherein said detected received copy protection information is interpreted to determine whether copying of said video information is permitted; and wherein said updated copy protection signals are generated and said generated blocks of video signals are combined with said updated copy protection signals where copying is permitted.

44. The method of claim 41, wherein said copy protection information includes SCMS code having a copy protect bit and an original bit.

45. The method of claim 41, wherein said step of generating updated copy protection signals includes forming packs comprised of item data and succeeding data, said item data determining the arrangement and function of said succeeding data.

46. The method of claim 45, wherein said generated blocks of video signals are combined with said packs for recording.

47. The method of claim 41, further comprising the steps of determining respective parity values for each of said combined signals; and encoding said combined signals and said respective parity values into coded signals for recording.

48. The method of claim 41, wherein the step of forming additional video signals includes deframing said blocks of video signals; inverse quantizing said deframed video signals; and decompressing said inverse quantized video signals for digital-to-analog converting.

49. The method of claim 41, wherein said generated copy protection signals are inserted into a vertical blanking period of said output composite video signal.

50. The method of claim 41, wherein said format further includes an audio area for audio information and respective accompanying audio information having accompanying audio copy protection information for restricting copying of said audio information; wherein the received digital signals are further decoded into blocks of audio signals and blocks of accompanying audio signals; wherein the blocks of audio signals are de-interleaved to form digital audio signals; and wherein the digital audio signals are converted to an output analog audio signal.

51. A method of recording digital video signals and outputting composite video signals in response to input video signals including video information and accompanying copy protection information for restricting copying of said video information, comprising the steps of:

forming blocks of digital video signals from said input video signals;

detecting said copy protection information in said input video signal;

generating first accompanying signals as a function of said detected copy protection information, said first accompanying signals including said copy protection information;

combining said blocks of digital video signals with said first accompanying signals into first combined signals;

transmitting said first combined signals;

receiving said first combined signals;

decoding said first combined signals into said blocks of video signals and into blocks of first accompanying signals;

decoding said blocks of first accompanying signals;

generating second accompanying signals as a function of the copy protection information included in the decoded blocks of first accompanying signals, said second accompanying signals including updated copy protection information indicating that said video information is being copied;

combining the decoded blocks of video signals with said second accompanying signals into second combined signals;

recording said second combined signals onto a recording medium;

forming a digital video signal from said decoded blocks of video signals;

converting said formed digital video signal to an analog composite video signal;

generating copy protection signals as a function of the copy protection information included in the decoded blocks of first accompanying signals; and inserting said generated copy protection signals into said composite video signal to form output composite video signals.

52. The method of claim 51, further comprising the steps of generating third accompanying signals as a function of the detected copy protection information in said input video signal, said third accompanying signals including updated copy protection information indicating that said video information is being copied; combining said blocks of digital video signals with said third accompanying signals into third combined signals; and recording said third combined signals onto a second recording medium.

* * * * *